US012583258B2

(12) United States Patent

Vandaele et al.

(10) Patent No.: US 12,583,258 B2

(45) Date of Patent: *Mar. 24, 2026

(54) TIRE COMPRISING A DURABLE STIFFENING STRUCTURE AND ALLOWING PROPER FLATTENING

(71) Applicant: COMPAGNIE GENERALE DES ETABLISSEMENTS MICHELIN, Clermont-Ferrand (FR)

(72) Inventors: Mathieu Vandaele, Clermont-Ferrand (FR); Mathieu Girard, Clermont-Ferrand (FR); Matthieu Bonnamour, Clermont-Ferrand (FR); Stephane Callamand, Clermont-Ferrand (FR); Alexandre Laval, Clermont-Ferrand (FR); David Hernandez, Clermont-Ferrand (FR); Julien Falempin, Clermont-Ferrand (FR); Antoine Filiol, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 100 days.

This patent is subject to a terminal disclaimer.

(21) Appl. No.: 18/283,527

(22) PCT Filed: Mar. 17, 2022

(86) PCT No.: PCT/FR2022/050486

§ 371 (c)(1),
(2) Date: Sep. 22, 2023

(87) PCT Pub. No.: WO2022/200715

PCT Pub. Date: Sep. 29, 2022

(65) Prior Publication Data

US 2025/0128547 A1 Apr. 24, 2025

(30) Foreign Application Priority Data

Mar. 22, 2021 (FR) ...................................... 2102821

(51) Int. Cl.
*B60C 9/18* (2006.01)
*B60C 9/08* (2006.01)
(Continued)

(52) U.S. Cl.
CPC .................. *B60C 9/18* (2013.01); *B60C 9/08* (2013.01); *B60C 2017/0081* (2013.01); *B60C 19/00* (2013.01); *B60C 2200/04* (2013.01)

(58) Field of Classification Search
CPC ..... B60C 2009/1892; B60C 9/18; B60C 9/08; B60C 17/04; B60C 17/06; B60C 17/0081; B60C 19/00
See application file for complete search history.

(56) References Cited

U.S. PATENT DOCUMENTS 3,010,504 A 11/1961 Polhemus
8,978,721 B2 3/2015 Tanaka et al.
(Continued)

FOREIGN PATENT DOCUMENTS

DE 102014018639 A1 * 6/2016 ............... B60C 5/12
EP 1253025 A2 10/2002
(Continued)

OTHER PUBLICATIONS

International Search Report dated May 18, 2022, in corresponding PCT/FR2022/050486 (4 pages).

*Primary Examiner* — Katelyn W Smith
*Assistant Examiner* — Thomas Frank Schneider
(74) *Attorney, Agent, or Firm* — VENABLE LLP

(57) ABSTRACT

The tire (10) has a stiffening structure (50) comprising a stiffening element (52, 53) anchored in or around radially
(Continued)

inner reinforcing structures (60A) and a radially outer reinforcing structure (70A, 70B). Each stiffening element (52, 53) extending from one of the radially inner reinforcing structures (60A) comprises a portion (523) extending in the toroidal cavity (35) between first anchor points. Each stiffening element (52, 53) extending from the other of the radially inner reinforcing structures (60B) comprises a portion (524) extending in the toroidal cavity (35) between second anchor points. The portions (523) do not cross over in the toroidal cavity (35). The first anchor points are axially on the other side of the same side of the median plane (M) of the tire (10) as the second anchor points.

21 Claims, 15 Drawing Sheets

(51) Int. Cl.
    *B60C 17/00*        (2006.01)
    *B60C 19/00*        (2006.01)

(56)            References Cited

U.S. PATENT DOCUMENTS

| | | | |
|---|---|---|---|
| 10,040,976 | B2 | 8/2018 | Doisneau et al. |
| 10,611,196 | B2 | 4/2020 | Parfondry et al. |
| 10,766,307 | B2 | 9/2020 | Vilcot et al. |
| 2005/0279438 | A1 | 12/2005 | Onracek |
| 2012/0247637 | A1 | 10/2012 | Tanaka et al. |
| 2013/0000803 | A1 | 1/2013 | Fugier |
| 2014/0235125 | A1 | 8/2014 | Doisneau et al. |
| 2015/0151592 | A1 | 6/2015 | Parfondry et al. |
| 2018/0194169 | A1 | 7/2018 | Vilcot et al. |
| 2019/0119535 | A1 | 4/2019 | Doisneau |
| 2021/0162808 | A1 | 6/2021 | Girard et al. |
| 2022/0063353 | A1 | 3/2022 | Girard et al. |
| 2024/0165997 | A1 | 5/2024 | Bonnamour et al. |
| 2024/0174025 | A1 | 5/2024 | Girard et al. |

FOREIGN PATENT DOCUMENTS

| | | | |
|---|---|---|---|
| EP | 1876038 | A1 | 1/2008 |
| EP | 2660075 | A1 | 11/2013 |
| EP | 3406462 | A1 | 11/2018 |
| FR | 2638398 | A1 | 5/1990 |
| FR | 3089870 | A1 | 6/2020 |
| GB | 2299554 | A | 10/1996 |
| JP | 2005-254993 | A | 9/2005 |
| WO | 2011/051203 | A1 | 5/2011 |
| WO | 2013/017422 | A1 | 2/2013 |
| WO | 2013/182477 | A1 | 12/2013 |
| WO | 2017/005713 | A1 | 1/2017 |
| WO | 2017/168107 | A1 | 10/2017 |
| WO | 2018/046376 | A1 | 3/2018 |
| WO | 2019/115917 | A1 | 6/2019 |
| WO | 2020/079366 | A1 | 4/2020 |
| WO | 2020/128225 | A1 | 6/2020 |

* cited by examiner

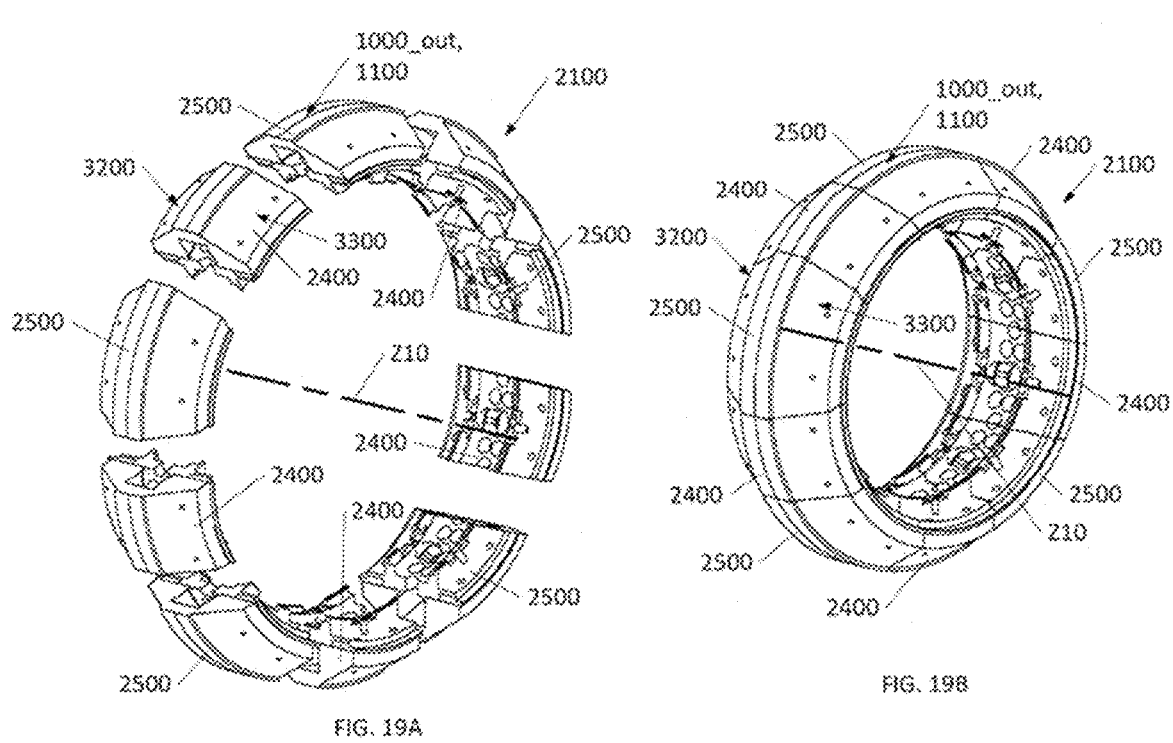
FIG. 19A
FIG. 19B
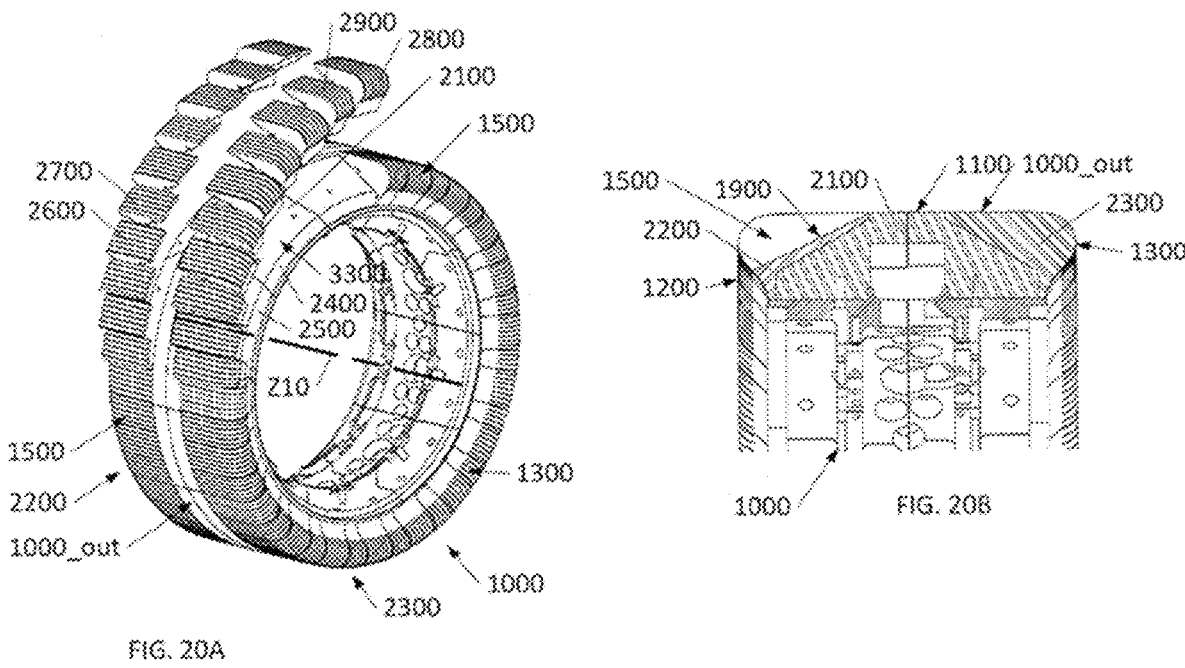
FIG. 20A
FIG. 20B

TIRE COMPRISING A DURABLE STIFFENING STRUCTURE AND ALLOWING PROPER FLATTENING

BACKGROUND

The present invention concerns a tyre, in particular for passenger vehicles. By tyre is meant a pneumatic tyre intended to form a cavity by cooperating with a mounting support, for example a rim, that cavity being adapted to be pressurised to a pressure higher than atmospheric pressure. A tyre according to the invention has a structure of substantially circular toroidal shape around a main axis of the tyre, that main axis coinciding with the rotation axis of the tyre.

There is known from the prior art a tyre intended to equip a passenger vehicle and described in WO2020/128225. The tyre described comprises a crown extended radially inwards on respective opposite sides of the median plane of the tyre by first and second sidewalls and then by first and second beads intended to come into contact with a mounting support, for example a rim. Each of the first and second beads comprises a circumferential reinforcing element intended to enable attachment of the tyre to the mounting support.

The tyre has an internal surface delimiting a toroidal inflation cavity of the tyre when the latter is mounted on the mounting support.

The tyre described in WO2020/128225 comprises a stiffening structure comprising first filar stiffening elements extending continuously in the toroidal cavity from the first bead to the crown and second filar stiffening elements extending continuously in the toroidal cavity from the second bead to the crown.

Each of the first and second filar stiffening elements is joined to each bead from which it extends by a bead interface between the filar stiffening element and a part of the internal surface of the bead. In an analogous manner, each of the first and second filar stiffening elements is fastened to the crown of the tyre by a crown interface between the filar stiffening element and a part of the internal surface of the crown. Each bead and crown interface comprises an elastomer mixture cushion positioned between the filar stiffening element and the corresponding part of the internal surface.

It has been noted that each bead and crown interface was loaded in peeling. Such interfaces are sensitive to the repeated loads that can lead to precocious separation of the filar stiffening elements and the internal surface of the bead and/or the internal surface situated radially inside the crown and therefore to precocious destruction of the stiffening structure.

Other assemblies or tyres are also known from the prior art, in particular from WO2019115917, GB2299554, FR3089870, FR2638398, U.S. Pat. No. 3,010,504 or US2005279438.

The invention has for object improving the durability of the stiffening structure.

SUMMARY

In a first embodiment, the invention therefore has for object a tyre comprising a crown extended radially inwards on each side of the median plane of the tyre by respective first and second sidewalls and then by first and second beads, the tyre having an internal surface delimiting a toroidal inflation cavity of the tyre and a stiffening structure comprising at least one stiffening element, the or each stiffening element being anchored in or around:

a first radially inner reinforcing structure in the first sidewall and/or the first bead, at least one radially outer reinforcing structure in the crown, a second radially inner reinforcing structure in the second sidewall and/or the second bead, so that the or each stiffening element extends continuously from the first sidewall and/or the first bead as far as the second sidewall and/or the second bead in the crown, the or each stiffening element comprises a portion extending in the toroidal cavity between:

a first radially inner anchor point at which the or each stiffening element passes through the internal surface to be anchored in or around the first radially inner reinforcing structure, a first radially outer anchor point at which the or each stiffening element passes through the internal surface to be anchored in or around the or a plurality of the radially outer reinforcing structures, the or each stiffening element comprises a portion extending in the toroidal cavity between:

a second radially inner anchor point at which the or each stiffening element passes through the internal surface to be anchored in or around the second radially inner reinforcing structure, a second radially outer anchor point at which the or each stiffening element passes through the internal surface to be anchored in or around the or a plurality of the radially outer reinforcing structures, each of the first and second radially inner anchor points and radially outer anchor points is such that:

the first radially outer anchor points and radially inner anchor points are axially on the same side of the median plane of the tyre, the second radially outer anchor points and radially inner anchor points are axially on the same other side of the median plane of the tyre, and the portion extending between the first radially outer anchor points and radially inner anchor points and the portion extending between the second radially outer anchor points and radially inner anchor points do not cross over in the toroidal cavity.

In a second embodiment, the invention also has for object a tyre comprising a crown extended radially inwards on each side of the median plane of the tyre by respective first and second sidewalls and then by first and second beads, the tyre having an internal surface delimiting a toroidal inflation cavity of the tyre and a stiffening structure comprising first and second stiffening elements:

the or each first stiffening element is anchored in or around:

a first radially inner reinforcing structure in the first sidewall and/or the first bead, at least one radially outer reinforcing structure in the crown, the or each second stiffening element is anchored in or around:

a second radially inner reinforcing structure in the second sidewall and/or the second bead, and at least one radially outer reinforcing structure in the crown, so that the or each of the first and second stiffening elements extends continuously in the toroidal cavity respectively from the first sidewall and/or the first bead and the second sidewall and/or the second bead as far as the crown, the or each first stiffening element comprises a portion extending in the toroidal cavity between:

a first radially inner anchor point at which the or each first stiffening element passes through the internal surface to be anchored in or around the first radially inner reinforcing structure, a first radially outer anchor point at which the or each first stiffening element passes through the internal surface to be anchored in or around the or a plurality of the radially outer reinforcing structures, the or each second stiffening element comprises a portion extending in the toroidal cavity between:

a second radially inner anchor point at which the or each second stiffening element passes through the internal surface to be anchored in or around the second radially inner reinforcing structure, a second radially outer anchor point at which the or each second stiffening element passes through the internal surface to be anchored in or around the or a plurality of the radially outer reinforcing structures, each of the first and second radially inner anchor points and radially outer anchor points is such that:

the first radially outer anchor points and radially inner anchor points are axially on the same side of the median plane of the tyre, the second radially outer anchor points and radially inner anchor points are axially on the same other side of the median plane of the tyre, the portion extending between the first radially outer anchor points and radially inner anchor points and the portion extending between the second radially outer anchor points and radially inner anchor points do not cross over in the toroidal cavity.

DETAILED DESCRIPTION

In the present description, when reference is made to a stiffening element or to each stiffening element without explicitly mentioning that this applies only to the first embodiment or to the second embodiment, it will be understood that this applies to the or to each stiffening element of the first embodiment of the invention and also to the first stiffening element and to the second stiffening element or to each of the first stiffening element and second stiffening element of the second embodiment of the invention.

Thanks to the radially inner and outer reinforcing structures the or each stiffening element is anchored on the one hand in each first sidewall and/or bead and each second sidewall and/or bead, on the other hand in the crown, which enables fastening by anchoring the or each stiffening element in the tyre. This kind of fastening by anchoring is significantly more robust than the bead and crown interfaces described in WO2020/128225. In fact, anchoring makes it possible to avoid loading in peeling and radial and axial slippage of the or each stiffening element toward the interior of the tyre. The durability of the stiffening structure of the tyre according to the invention is therefore significantly improved as demonstrated by the tests carried out and described hereinafter.

Thanks to anchoring the or each stiffening element in the crown, the or each stiffening element is fixed axially and radially relative to the part of the crown in which it is anchored. In an analogous manner, thanks to anchoring the or each stiffening element in the sidewall and/or the bead, the or each stiffening element is fixed axially and radially relative to the part of the sidewall and/or of the bead in which it is anchored.

Each of the first and second radially inner reinforcing structures being respectively arranged in the first and second sidewalls or the bead and the or each radially outer reinforcing structure being arranged in the crown of the tyre, that is to say arranged radially inside the internal surface and buried in the mass of material constituting the sidewall or the bead and in the crown, the or each stiffening element passes through the internal surface to be anchored in or around each of the first and second radially inner reinforcing structures at first and second radially inner anchor points and through the internal surface to be anchored in or around the radially outer reinforcing structure at first and second radially outer anchor points. This feature in particular makes it possible to reduce the noise generated by the stiffening structure, which noise is damped by the structure of the tyre separating the or each radially inner or outer reinforcing structure from the mounting support.

In accordance with the invention, the or each stiffening element is anchored in or around each of the first and second radially inner reinforcing structures and the or each radially outer reinforcing structure. Thus, in a first variant, the or each stiffening element may be anchored in the structure of one, a plurality or all of the reinforcing structures, that is to say each stiffening element penetrates at least in part into that structure, or even passes completely through it so that the structure forms a mechanical anchorage of the or each stiffening element in the structure. In particular, in the situation where the structure is an assembly of a plurality of filar elements, stating that the or each stiffening element is anchored in the structure means, for example, that the or each stiffening element is wound around certain filar elements of the structure so as to pass through the structure itself. In a second variant the or each stiffening element may be anchored around the structure of one, a plurality or all of the reinforcing structures, that is to say that the or each stiffening element bears on that structure so that the structure absorbs some of the forces exerted on the or each stiffening element and anchors the structure in the sidewall or the bead and the crown. In particular, in the situation where the structure is an assembly of a plurality of filar elements, stating that the or each stiffening element is anchored around the structure means, for example, that the or each stiffening element is wound around peripheral filar elements of the structure without passing through it.

In accordance with the invention, the portions extending on the one hand between the first anchor points situated on the same side of the of the median plane and on the other hand between the second anchor points situated on the other side of the median plane do not cross over, which makes it possible to limit the axial flexing of the tread, in particular under conditions of high lateral loading. Accordingly, on the one hand, a regular contact area is maintained and, on the other hand, the risk of deterioration of the reinforcement of the crown of the tyre is reduced, in particular by avoiding compression of the various constituent elements of the crown reinforcement, for example textile and metal filar reinforcing elements of the crown reinforcement.

In the first embodiment the or each stiffening element is continuous between the first and second sidewalls or beads. Thus there is no edge of the stiffening element to be anchored in the crown which on the one hand facilitates manufacture of the tyre and on the other hand limits the risks of slippage of an edge of the stiffening element situated in the crown. The or each stiffening element being continuous, this also improves the transmission of forces between each first and second sidewall and/or bead, which forces are therefore distributed over the whole of the tyre. Moreover, the stiffening structure exerts its function on each side of the median plane of the tyre, which makes it possible to achieve homogeneous behaviour of the tyre.

In the second embodiment, in contrast to the first embodiment, the or each first stiffening element is distinct from the or each second stiffening element and discontinuous relative to the or to each second stiffening element.

The toroidal inflation cavity is intended to be pressurised by an inflation gas once the tyre is mounted on a mounting support, most often a rim.

Among other advantages, the stiffening structure enables simultaneous increase in the radial stiffness, the axial stiffness and the cornering stiffness of the tyre compared to a classic tyre comprising no stiffening structure but also compared to tyres comprising other stiffening structures, such as that described in WO2017/005713. The radial stiffness, expressed in daN/mm, is the radial force generated by the tyre upon application of a radial displacement equal to 1 mm. The axial stiffness, expressed in daN/mm, is the axial force generated by the tyre on application of an axial displacement equal to 1 mm. The cornering stiffness, expressed in daN/°, is the axial force generated by the tyre when rolling with an angle of 1° about the radial axis.

By increasing the radial stiffness the stiffening structure limits the radial deformation of the crown when rolling and in particular the counter flexing, that is to say the radial deformation, opposite the area of contact of the tread in contact with the ground. Accordingly, during rolling of the tyre around the wheel the stiffening structure makes it possible to limit the amplitude of the cyclic deformations of the tyre and in particular of its tread and therefore to limit the resulting dissipation of energy, which contributes to reducing the resistance to rolling. Moreover, with radial loading, the value of the area of contact with the ground is not modified, which makes it possible to preserve the same grip performance as that of the tyre described in WO2017/005713.

By increasing the axial stiffness and the cornering stiffness, the stiffening structure is going to contribute to improving behaviour under transverse loading, for example when cornering. Moreover, under transverse loading the area of contact with the ground guarantees a more homogeneous distribution of the contact pressures, which makes it possible to increase the transverse grip.

Moreover, the stiffening structure participates at least partially in supporting the load applied to the tyre so that this applied load is absorbed conjointly by the tyre, thanks to its tyre stiffness and its intrinsic structural stiffness, and by the stiffening structure. Accordingly, when the tyre is subjected to a nominal radial load the or each stiffening element arranged opposite the contact area is under tension. Conversely, in some embodiments, the or each stiffening element aligned with the contact area is subjected to buckling in compression.

The presence of a stiffening structure therefore makes it possible to reduce the contribution of the tyre to load support and therefore to be able to reduce its structural stiffness, for example by reducing the volume of the beads. In fact, the beads of a classic tyre dissipate a significant quantity of energy because of their volume and the hysteresis character of their constituent elastomer mixture. Reducing their volume therefore enables a significant reduction of the rolling resistance.

The stiffening elements are two by two independent in the toroidal cavity of the tyre, that is to say not mechanically interconnected in the toroidal cavity, so that they have independent mechanical behaviours. For example, they are not interconnected in such a way as to form a network or a mesh in the cavity.

The tyre according to the invention has a substantially toroidal shape around an axis of revolution substantially coinciding with the axis of rotation of the tyre. This axis of revolution defines three directions classically used by the person skilled in the art: an axial direction, a circumferential direction and a radial direction.

By axial direction is meant the direction substantially parallel to the axis of revolution of the tyre, that is to say the axis of rotation of the tyre.

By circumferential direction is meant the direction that is substantially perpendicular both to the axial direction and to a radius of the tyre (in other words tangential to a circle the centre of which is on the axis of rotation of the tyre).

By radial direction is meant the direction along a radius of the tyre, that is to say any direction intersecting the axis of rotation of the tyre and substantially perpendicular to that axis.

By median plane (denoted M) of the tyre is meant the plane perpendicular to the axis of rotation of the tyre that is situated axially half-way between the two beads and passes through the axial middle of the crown reinforcement.

By equatorial circumferential plane (denoted E) of the tyre there is meant, in a meridian section plane, the plane passing through the equator of the tyre, perpendicular to the median plane and to the radial direction. The equator of the tyre is, in a meridian section plane (a plane perpendicular to the circumferential direction and parallel to the radial and axial directions), the axis parallel to the axis of rotation of the tyre and situated equidistantly between the radially outermost point of the tread intended to be in contact with the ground and the radially innermost point of the tyre intended to be in contact with a support, for example a rim.

By median plane is meant a plane parallel to and containing the axis of rotation of the tyre and perpendicular to the circumferential direction.

By radially inner, respectively radially outer, is meant closer to the axis of rotation of the tyre, respectively farther from the axis of rotation of the tyre. By axially inner, respectively axially outer, is meant closer to the median plane of the tyre, respectively farther from the median plane of the tyre.

By bead is meant the radial portion of the tyre intended to enable attachment of the tyre to a mounting support, for example a wheel comprising a rim. Accordingly, each bead is in particular intended to be in contact with a hook of the bead enabling its attachment. The bead is therefore delimited radially internally by the radially inner edge of the tyre and radially externally by an axial straight line segment passing through the radially outermost point in contact with a standard rim in the sense of the standard issued by the European Tyre and Rim Technical Organisation (ETRTO), 2020.

By sidewall is meant the radial portion of the tyre connecting the bead to the crown. The sidewall is delimited radially externally by a straight line segment perpendicular to the external surface of the tyre passing through the point at which the angle between the tangent to the external surface of the tyre and a straight line segment parallel to the axial direction passing through that point is equal to 30°. When there exists on a meridian section plane a plurality of points at which said angle is equal in absolute value to 30° the radially outermost point is retained. The sidewall is delimited radially internally by an axial straight line segment passing through the radially outermost point in contact with a standard rim in the sense of the European Tyre and Rim Technical Organisation (ETRTO), 2020.

Any range of values designated by the expression "between a and b" represents the range of values extending from more than a to less than b (that is to say excluding the limits a and b) while any range of values designated by the expression "from a to b" means the range of values from a up to b (that is to say including the strict limits a and b).

The tyres of the invention are preferably intended for passenger vehicles as defined in the sense of the European Tyre and Rim Technical Organisation (ETRTO), 2020. A tyre of this kind has a section in a meridian section plane characterised by a section height H and a nominal section width SW in the sense of the European Tyre and Rim Technical Organisation (ETRTO), 2020. The values of SW and H are indicated in the markings on the sidewall of the tyre, for example as defined in the ETRTO manual, 2020.

Tyres for passenger vehicles to which the invention will be applied with advantage are preferably such that the ratio H/S expressed as a percentage is at most equal to 90, preferably at most equal to 80 and more preferably at most equal to 70 and is at least equal to 20, preferably at least equal to 30, and the nominal section width SW is preferably at least equal to 115 mm, preferably at least equal to 155 mm and more preferably at least equal to 175 mm and at most equal to 385 mm, preferably at most equal to 315 mm, more preferably at most equal to 285 mm. Moreover, the diameter D at the hook defining the diameter of the rim for mounting the tyre is at least equal to 12 inches, preferably at least equal to 16 inches and at most equal to 24 inches, preferably at most equal to 21 inches.

In a tyre including a crown reinforcement and a carcass reinforcement the crown conventionally includes a tread intended to come into contact with the ground and a crown reinforcement arranged radially inside the tread. The tyre also includes a carcass reinforcement anchored in each bead and extending radially in each side wall and axially in the crown, radially inside the crown reinforcement. Conventionally, the crown reinforcement includes at least one crown layer including reinforcement elements. Those reinforcement elements are preferably metal or textile filar elements. The carcass reinforcement is anchored in each bead by means of the circumferential reinforcing element or elements.

In embodiments enabling performance to be achieved in so-called radial tyres as defined by the ETRTO, the carcass reinforcement includes at least one carcass layer, the or each carcass layer including carcass filar reinforcing elements, each carcass filar reinforcing element extending substantially in a main direction forming with the circumferential direction of the tyre an angle with an absolute value from 80° to 90°.

In a preferred variant of the first preferred embodiment the or each stiffening element is anchored in or around:
  the first radially inner reinforcing structure,
  first and second radially outer reinforcing structures in the crown,
  the second radially inner reinforcing structure.

In this preferred variant the tyre comprises first and second radially outer reinforcing structures distinct from one another. This makes it possible to reduce the weight of the reinforcing structure enabling anchoring of the stiffening element or elements in the crown. Moreover, for a given axial width, the use of first and second radially outer reinforcing structures compared to a single radially outer reinforcing structure enables limitation of the permitted stress in the crown, which enables a regular contact area to be preserved.

In an analogous manner, in a preferred variant of the second preferred embodiment,
the or each first stiffening element is anchored in or around:
  the first radially inner reinforcing structure, and
  a first radially outer reinforcing structure in the crown,
the or each second stiffening element is anchored in or around:
  the second radially inner reinforcing structure, and
  a second radially outer reinforcing structure in the crown distinct from the first radially outer reinforcing structure.

In the first embodiment, the first and second radially outer reinforcing structures are optionally axially on either side of the median plane of the tyre, preferably substantially symmetrically with respect to the median plane of the tyre. The axial distribution of the forces exerted by the stiffening elements on each first and second sidewall and/or bead and on the crown is therefore improved.

In an analogous manner, in the second embodiment, the first and second radially outer reinforcing structures are optionally axially on either side of the median plane of the tyre, preferably substantially symmetrically with respect to the median plane of the tyre.

In a preferred variant of the first embodiment, the stiffening structure comprises a plurality of stiffening elements forming a continuous stiffening element so as to trace out a boustrophedon path through the crown between the first sidewall and/or the first bead and the second sidewall and/or the second bead.

The robustness of the stiffening structure is therefore further improved by eliminating the edges of the stiffening element to be anchored in each sidewall or each bead. In this variant it is therefore possible to have a continuous stiffening element forming the stiffening structure over all the circumference of the tyre. It is equally possible to have a plurality of continuous stiffening elements each forming a part of the stiffening structure over a part of the circumference of the tyre. Moreover, a stiffening structure of this kind is relatively simple to produce because a single stiffening element is used the laying law of which can be varied as a function of the different tyre dimensions. If a plurality of stiffening elements distinct from one another is used, it will then be necessary to adjust their length for each tyre dimension.

In an analogous manner, in a preferred variant of the second embodiment, the stiffening structure comprises:
  a plurality of first stiffening elements forming a first continuous stiffening element so as to trace out a boustrophedon path between the first sidewall and/or the first bead and the crown,
  a plurality of second stiffening elements forming a second continuous stiffening element so as to trace out a boustrophedon path between the second sidewall and/or the second bead and the crown.

In a fourth embodiment forming a variant of the first embodiment, the stiffening structure comprises at least one axially inner anchor stiffening element and at least one axially outer anchor stiffening element, the or each axially inner anchor stiffening element is anchored in or around:
  a first radially inner anchor reinforcing structure of the or each axially inner anchor stiffening element in a first sidewall and/or a first bead, and
  at least one radially outer anchor reinforcing structure of the or each axially inner anchor stiffening element in the crown, a second radially inner anchor reinforcing structure of the or each axially inner anchor stiffening element in a second sidewall and/or a second bead situated on the other side to the first sidewall and/or the first bead relative to the median plane of the tyre, so that the or each axially inner anchor stiffening element extends continuously from the first sidewall and/or the first bead as far as the second sidewall and/or the second bead in the crown, the or each axially inner anchor stiffening element comprises:

a first portion extending in the toroidal cavity between:

a first radially inner anchor point at which the or each axially inner anchor stiffening element passes through the internal surface to be anchored in or around the first radially inner anchor reinforcing structure of the or each axially inner anchor stiffening element, a first radially outer anchor point at which the or each axially inner anchor stiffening element passes through the internal surface to be anchored in or around the one or more radially outer anchor reinforcing structures of the or each axially inner anchor stiffening element, a second portion extending in the toroidal cavity between:

a second radially inner anchor point at which the or each axially inner anchor stiffening element passes through the internal surface to be anchored in or around the second radially inner anchor reinforcing structure of the or each axially inner anchor stiffening element, a second radially outer anchor point at which the or each axially inner anchor stiffening element passes through the internal surface to be anchored in or around the one or more radially outer anchor reinforcing structures of the or each axially inner anchor stiffening element, the or each axially outer anchor stiffening element is anchored in or around:

a first radially inner anchor reinforcing structure of the or each axially outer anchor stiffening element in the first sidewall and/or the first bead, and at least one radially outer anchor reinforcing structure of the or each axially outer anchor stiffening element in the crown, a second radially inner anchor reinforcing structure of the or each axially outer anchor stiffening element in the second sidewall and/or the second bead situated on the other side to the first sidewall and/or the first bead relative to the median plane of the tyre, so that the or each axially outer anchor stiffening element extends continuously from the first sidewall and/or the first bead as far as the second sidewall and/or the second bead in the crown, the or each axially outer anchor stiffening element comprises:

a first portion extending in the toroidal cavity between:

a first radially inner anchor point at which the or each axially outer anchor stiffening element passes through the internal surface to be anchored in or around the first radially inner anchor reinforcing structure of the or each axially outer anchor stiffening element, a first radially outer anchor point at which the or each axially outer anchor stiffening element passes through the internal surface to be anchored in or around the one or more radially outer anchor reinforcing structures of the or each axially outer anchor stiffening element, a second portion extending in the toroidal cavity between:

a second radially inner anchor point at which the or each axially outer anchor stiffening element passes through the internal surface to be anchored in or around the second radially inner anchor reinforcing structure of the or each axially outer anchor stiffening element, a second radially outer anchor point at which the or each axially outer anchor stiffening element passes through the internal surface to be anchored in or around the one or more radially outer anchor reinforcing structures of the or each axially outer anchor stiffening element, each of the first and second radially inner anchor points and radially outer anchor points of each axially inner anchor stiffening element and axially outer stiffening element is such that:

the portion extending between the first radially outer anchor points and radially inner anchor points of each axially inner anchor stiffening element and the portion extending between the second radially outer anchor points and radially inner anchor points of each axially inner anchor stiffening element do not cross over in the toroidal cavity, the portion extending between the first radially outer anchor points and radially inner anchor points of each axially outer anchor stiffening element and the portion extending between the second radially outer anchor points and radially inner anchor points of each axially outer anchor stiffening element do not cross over in the toroidal cavity, the first radially outer anchor points and radially inner anchor points of each axially inner anchor stiffening element and axially outer anchor stiffening element are axially on the same side of the median plane of the tyre, and the second radially outer anchor points and radially inner anchor points of each axially inner anchor stiffening element and axially outer anchor stiffening element are axially on the same other side of the median plane of the tyre, and each of the first and second radially outer anchor points of the or each axially inner anchor stiffening element is axially and respectively inside each of the first and second radially outer anchor points of the or each axially outer anchor stiffening element.

The expression axially inner or outer anchor stiffening element is used by reason of the axial offsetting of the radially outer anchor point or points of each stiffening element in the crown. Thus it is said of a stiffening element that it is an axially outer anchor stiffening element because its anchor point in the crown is axially farther from the median plane of the tyre than another axially inner anchor stiffening element the anchor point of which in the crown is axially closer to the median plane of the tyre.

Regardless of the configuration of the fourth embodiment, in a variant each of the first and second radially inner anchor points of the or each axially inner anchor stiffening element and each of the first and second first radially inner anchor points of the or each axially outer anchor stiffening element are respectively radially aligned on the same circumferential line. In another variant each of the first and second first radially inner anchor points of the or each axially inner anchor stiffening element and each of the first and second first radially inner anchor points of the or each axially outer anchor stiffening element are respectively radially offset relative to one another, as is envisaged in the fifth embodiment below.

Regardless of the configuration of the fourth embodiment, in a variant each of the first and second radially inner and outer anchor points of the or each axially inner anchor stiffening element is in the same meridian section plane as each of the first and second radially inner and outer anchor points of the or each axially outer anchor stiffening element. In another variant each of the first and second radially inner and outer anchor points of the or each axially inner anchor stiffening element is in a different meridian section plane than each of the first and second radially inner and outer anchor points of the or each axially outer anchor stiffening element.

Each of the first and second radially inner anchor reinforcing structures of the or each axially inner anchor stiffening element is very advantageously and respectively each of the first and second radially inner anchor reinforcing structures of the or each axially outer anchor stiffening element. Alternatively, each of the first and second radially inner anchor reinforcing structures of the or each axially inner anchor stiffening element is distinct from each of the first and second radially inner anchor reinforcing structures of the or each axially outer anchor stiffening element.

In a highly advantageous manner the radially outer anchor reinforcing structure or structures of the or each axially inner anchor stiffening element is or are the radially outer anchor reinforcing structure or structures of the or each axially outer anchor stiffening element.

In a fifth embodiment forming another variant of the first embodiment, the stiffening structure comprises at least one radially inner anchor stiffening element and at least one radially outer anchor stiffening element, the or each radially inner anchor stiffening element is anchored in or around:

a first radially inner anchor reinforcing structure of the or each radially inner anchor stiffening element in a first sidewall and/or a first bead, and at least one radially outer anchor reinforcing structure of the or each radially inner anchor stiffening element in the crown, a second radially inner anchor reinforcing structure of the or each radially inner anchor stiffening element in a second sidewall and/or a second bead situated on the other side to the first sidewall and/or the first bead relative to the median plane of the tyre, so that the or each radially inner anchor stiffening element extends continuously from the first sidewall and/or the first bead as far as the second sidewall and/or the second bead in the crown, the or each radially inner anchor stiffening element comprises:

a first portion extending in the toroidal cavity between:

a first radially inner anchor point at which the or each radially inner anchor stiffening element passes through the internal surface to be anchored in or around the first radially inner anchor reinforcing structure of the or each radially inner anchor stiffening element, a first radially outer anchor point at which the or each radially inner anchor stiffening element passes through the internal surface to be anchored in or around the one or more radially outer anchor reinforcing structures of the or each radially inner anchor stiffening element, a second portion extending in the toroidal cavity between:

a second radially inner anchor point at which the or each radially inner anchor stiffening element passes through the internal surface to be anchored in or around the second radially inner anchor reinforcing structure of the or each radially inner anchor stiffening element, a second radially outer anchor point at which the or each radially inner anchor stiffening element passes through the internal surface to be anchored in or around the one or more radially outer anchor reinforcing structures of the or each radially inner anchor stiffening element, the or each radially outer anchor stiffening element is anchored in or around:

a first radially inner anchor reinforcing structure of the or each radially outer anchor stiffening element in the first sidewall and/or the first bead, and at least one radially outer anchor reinforcing structure of the or each radially outer anchor stiffening element in the crown, a second radially inner anchor reinforcing structure of the or each radially outer anchor stiffening element in the second sidewall and/or the second bead situated on the other side to the first sidewall and/or the first bead relative to the median plane of the tyre, so that the or each radially outer anchor stiffening element extends continuously from the first sidewall and/or the first bead as far as the second sidewall and/or the second bead, in the crown, the or each radially outer anchor stiffening element comprises:

a first portion extending the toroidal cavity between:

a first radially inner anchor point at which the or each radially outer anchor stiffening element passes through the internal surface to be anchored in or around the first radially inner anchor reinforcing structure of the or each radially outer anchor stiffening element, a first radially outer anchor point at which the or each radially outer anchor stiffening element passes through the internal surface to be anchored in or around the one or more radially outer anchor reinforcing structures of the or each radially outer anchor stiffening element, a second portion extending in the toroidal cavity between:

a second radially inner anchor point at which the or each radially outer anchor stiffening element passes through the internal surface to be anchored in or around the second radially inner anchor reinforcing structure of the or each radially outer anchor stiffening element, a second radially outer anchor point at which the or each radially outer anchor stiffening element passes through the internal surface to be anchored in or around the one or more radially outer anchor reinforcing structures of the or each radially outer anchor stiffening element, each of the first and second radially inner anchor points and radially outer anchor points of each axially inner anchor stiffening element and axially outer anchor stiffening element is such that:

the portion extending between the first radially outer anchor points and radially inner anchor points of each radially inner anchor stiffening element and the portion extending between the second radially outer anchor points and radially inner anchor points of each radially inner anchor stiffening element do not cross over in the toroidal cavity, the portion extending between the first radially outer anchor points and radially inner anchor points of each radially outer anchor stiffening element and the portion extending between the second radially outer anchor points and radially inner anchor points of each radially outer anchor stiffening element do not cross over in the toroidal cavity, the first radially outer anchor points and radially inner anchor points of each radially inner anchor stiffening element and radially outer anchor stiffening element are axially on the same side of the median plane of the tyre, and the second radially outer anchor points and radially inner anchor points of each radially inner anchor stiffening element and radially outer anchor stiffening element are axially on the same other side of the median plane of the tyre, and each of the first and second radially inner anchor points of the or each radially inner anchor stiffening element is radially and respectively inside each of the first and second radially inner anchor points of the or each radially outer anchor stiffening element.

The expressions radially inner and outer anchor stiffening elements are used by virtue of the radial offset of the radially inner anchor point or points of each stiffening element in each sidewall and/or each bead. Thus a stiffening element is termed a radially outer anchor stiffening element because its anchor point in each sidewall and/or each bead is radially farther from the axis of rotation of the tyre than another radially inner anchor stiffening element the anchor point of which in the crown is radially closer to the axis of rotation of the tyre.

Regardless of the configuration of the fifth embodiment, in a variant each of the first and second radially outer anchor points of the or each radially inner anchor stiffening element and each of the first and second first radially outer anchor points of the or each radially outer anchor stiffening element are respectively axially aligned with the same circumferential line. In another variant each of the first and second first radially outer anchor points of the or each radially inner anchor stiffening element and each of the first and second first radially outer anchor points of the or each radially outer anchor stiffening element are respectively offset axially relative to one another as envisaged in the fourth embodiment described hereinabove.

Regardless of the configuration of the fifth embodiment, in a variant each of the first and second radially inner and outer anchor points of the or each radially inner anchor stiffening element is in the same meridian section plane as each of the first and second radially inner and outer anchor points of the or each radially outer anchor stiffening element. In another variant each of the first and second radially inner and outer anchor points of the or each radially inner anchor stiffening element is in a different meridian section plane to each of the first and second radially inner and outer anchor points of the or each radially outer anchor stiffening element.

Each of the first and second radially inner anchor reinforcing structures of the or each radially inner anchor stiffening element is very advantageously each of the first and second radially inner anchor reinforcing structures of the or each radially outer anchor stiffening element. Alternatively, each of the first and second radially inner anchor reinforcing structures of the or each radially inner anchor stiffening element is distinct from each of the first and second radially inner anchor reinforcing structures of the or each radially outer anchor stiffening element.

The radially outer anchor reinforcing structure or structures of the or each radially inner anchor stiffening element is or are very advantageously the radially outer anchor reinforcing structure or structures of the or each radially outer anchor stiffening element.

It will be noted that the fourth and fifth embodiments could be combined to differentiate the anchorage in the crown and each sidewall and/or each bead and to have radially and axially inner stiffening elements or radially and axially outer stiffening elements or radially inner and axially outer stiffening elements or radially outer and axially inner stiffening elements.

Optionally, whether in the first or second embodiment, each bead comprising at least one circumferential reinforcing element intended to enable attachment of the tyre onto a mounting support of the tyre, the first radially inner reinforcing structure is distinct from the or each circumferential reinforcing element situated on the same first side of the median plane of the tyre as said first sidewall and/or said first bead. Alternatively, the first radially inner reinforcing structure may comprise the or each circumferential reinforcing element situated on the same first side of the median plane of the tyre as said first sidewall and/or said first bead.

Still optionally, whether in the first or second embodiment, each bead comprising at least one circumferential reinforcing element intended to enable attachment of the tyre onto a mounting support of the tyre, the second radially inner reinforcing structure is distinct from the or each circumferential reinforcing element situated on the same second side of the median plane of the tyre as said second sidewall and/or said second bead. Alternatively, the second radially inner reinforcing structure may comprise the or each circumferential reinforcing element situated on the same second side of the median plane of the tyre as said second sidewall and/or said second bead.

The fact that the or each radially inner reinforcing structure is distinct from the or each circumferential reinforcing element situated on the same side of the median plane of the tyre makes it possible to reduce very significantly the propagation of noise generated by the stiffening structure from the stiffening structure to the vehicle via the mounting support of the tyre. In fact, the inventors have advanced the hypothesis that the noise generated by the stiffening structure is damped by the structure of the tyre separating the or each radially inner reinforcing structure from each circumferential reinforcing element intended to enable attachment of the tyre to its mounting support. This damping is the result of the fact that, by virtue of being distinct from the or each circumferential reinforcing element situated on the same side of the median plane of the tyre, the radially inner reinforcing structure is mechanically decoupled from the or each circumferential reinforcing element situated on the same side of the median plane of the tyre. In other words, the radially inner reinforcing structure and the or each circumferential reinforcing element situated on the same side of the median plane of the tyre are physically separated from one another by one or more decoupling materials, for example elastomer materials, enabling mechanical decoupling of the one from the other.

In a preferred variant embodiment of the first and second embodiments, the stiffening structure comprises a plurality of stiffening elements distributed circumferentially in the toroidal cavity or a plurality of first and second stiffening elements distributed circumferentially in the toroidal cavity.

The stiffening structure therefore exercises its function over all the circumference of the tyre.

The circumferential distribution may be obtained by means of a stiffening structure in which the stiffening elements are distributed at a constant circumferential pitch over all the circumference of the tyre or by a stiffening structure in which the stiffening elements are distributed periodically over all the circumference of the tyre or again by a stiffening structure in which the stiffening elements are distributed randomly over all the circumference of the tyre.

In one advantageous configuration applicable to the first and second embodiments, the or each stiffening element is not gastight with respect to an inflation gas of the tyre. Accordingly, the or each stiffening element allows the inflation gas to pass through it. In other words, the or each stiffening element does not delimit any secondary cavity under pressure of the tyre. Stating that it is not gastight means that the stiffening element is permeable to the inflation gas so that the pressure is homogeneous in the toroidal cavity at all times and in particular during inflation of the tyre.

To make possible a method of manufacture that is relatively easy to implement, the tyre highly advantageously comprising a carcass reinforcement anchored in each bead, the crown including a crown reinforcement and a tread, the carcass reinforcement extending in each sidewall and in the crown radially inside the crown reinforcement, the or each radially outer reinforcing structure is arranged radially inside the carcass reinforcement.

Whether in the first or the second embodiment, each of the first and second radially inner anchor points is very advantageously arranged radially at a radial distance from $0.10 \times H$ to $0.50 \times H$, preferably from $0.10 \times H$ to $0.35 \times H$, of the radially innermost point of the tyre, H being the section height of the tyre.

The propagation of noise generated by the stiffening structure from the stiffening structure to the vehicle via the mounting support of the tyre is therefore further reduced. In fact, beyond a radial distance equal to $0.10 \times H$ the radially inner anchor point is far away from the bead, and in particular from the circumferential reinforcing elements of the beads, for example the bead wires, in order for sound waves generated by the stiffening structure to be damped significantly by the structure of the tyre before reaching the circumferential reinforcing element that constitutes a major element of transmission of noise between the tyre and the mounting support. Nevertheless, it is preferable for the radially inner anchor point not to be at too great a radial distance so as to enable effective absorption of axial forces between the stiffening structure and the sidewall or the bead via the stiffening element or each of the first and second stiffening elements and therefore to participate in improving the axial stiffness.

Whether in the first or the second embodiment, each of the first and second radially outer anchor points is very advantageously arranged axially at an axial distance at most equal to $0.45 \times SW$, preferably from $0.05 \times SW$ to $0.45 \times SW$, of the median plane of the tyre, SW being the nominal section width of the tyre.

Beyond $0.45 \times S$ the or each stiffening element extends in a direction forming too small an angle relative to the radial direction, which reduces the contribution to the axial and cornering stiffnesses, respectively.

Where the stiffening structure is concerned, each stiffening element, whether in the first or the second embodiment, can be characterised geometrically, in particular by its mean section Sm, this feature not necessarily being identical for all of the stiffening elements. The mean section Sm is the mean of the sections obtained by the intersection of the stiffening element with all the cylindrical surfaces coaxial with the tyre and radially included within the inner toroidal cavity. In the most frequent situation of a constant section, the mean section Sm is the constant section of the stiffening element. The mean section Sm comprises a greater characteristic dimension Dmax and a lesser characteristic dimension Dmin, of which the ratio R=Dmax/Dmin is termed the form factor. By way of example, a stiffening element having a circular mean section Sm and a diameter equal to d has a form factor R=1, a stiffening element having a rectangular mean section Sm, a length L and a width I has a form factor R=L/I, and a stiffening element having an elliptical mean section Sm having a major axis D and a minor axis d has a form factor R=D/d.

A first preferred type of stiffening element with a form factor R at most equal to 3 is termed unidimensional. In other words, a stiffening element is considered unidimensional when the characteristic greatest dimension Dmax of its mean section Sm is at most equal to 3 times the smallest characteristic dimension Dmin of its mean section Sm. A unidimensional stiffening element has a mechanical behaviour of filar type, that is to say it can be subjected only to tension and compression forces along its mean line. This is why a unidimensional stiffening element is usually referred to as a filar stiffening element. Of the components routinely used in the field of tyres, textile filar elements consisting of an assembly of textile elementary monofilaments or metal cables constituted by an assembly of metal elementary monofilaments can be considered unidimensional stiffening elements because, their mean section Sm being substantially circular, the form factor R is equal to 1 and therefore less than 3.

A second type of stiffening element with a form factor R at least equal to 3 is termed bidimensional. In other words, a stiffening element is considered bidimensional when the characteristic greatest dimension Dmax of its mean section Sm is at least equal to 3 times the smallest characteristic dimension Dmin of its mean section Sm. A bidimensional stiffening element exhibits membrane type mechanical behaviour, that is to say it can be subjected only to tension or compression forces within its thickness defined by the characteristic smallest dimension Dmin of its mean section Sm. In a first variant a stiffening element with a form factor R at least equal to 3 and at most equal to 50 is termed lanyard-type bidimensional. In accordance with the second variant, a stiffening element with a form factor R at least equal to 50 is termed film-type bidimensional.

In accordance with a first structure variant of the stiffening element any stiffening element has a homogeneous structure comprising a single component. This is the simplest structure envisaged, such as, for example, an elementary monofilament of a single material or a layer of a single material. In accordance with a second structure variant any stiffening element has a composite structure comprising at least two components. It is a structure consisting of an assembly of at least two elements such as, for example, an assembly comprising a plurality of elementary monofilaments or an assembly of a first layer of a first material and a second layer of a second material.

Concerning the material or materials constituting the stiffening element, in a first composition variant any stiffening element comprises a single material: for example an elementary monofilament of a single material or an assembly comprising a plurality of elementary monofilaments of the same material. In a second composition variant any stiffening element comprises at least two materials. In this case, one has a composite structure from the point of view of the materials: for example, an assembly comprising elementary monofilaments of a first material and elementary monofilaments of a second material different from the first material or a layer comprising elementary monofilaments or assemblies of elementary monofilaments embedded in a polymeric matrix.

In a highly-advantageous configuration applicable to the first and second embodiments, the or each stiffening element or the or each of the first and second stiffening elements is a filar stiffening element, preferably a textile filar stiffening element. The stiffening filar elements are preferably identical, that is to say have the same geometric characteristics and consist of identical materials.

These filar stiffening elements are usually called stays. The benefit of using filar stiffening elements is to produce a stiffening structure having a low weight and low hysteresis. The use of identical stiffening filar elements enables a homogeneous distribution of the forces between the stiffening elements.

When it is filar, each filar stiffening element is preferably textile. By textile is meant that each filar stiffening element is non-metallic, for example made of a material selected from a polyester, a polyamide, a polyketone, a polyvinyl alcohol, a cellulose, a mineral fibre, a natural fibre, an elastomer material or a mixture of those materials. Of the polyesters there will be cited for example PET (polyethylene terephthalate), PEN (polyethylene naphthalate), PBT (polybutylene terephthalate), PBN (polybutylene naphthalate), PPT (polypropylene terephthalate), PPN (polypropylene naphthalate). Of the polyamides there will be cited aliphatic polyamides such as 4-6, 6, 6-6 polyamides (nylon), 11 or 12 and aromatic polyamides such as aramide. The material is preferably a polyester or an aliphatic polyamide.

For example each textile filar stiffening element is a textile assembly comprising one or more elementary monofilaments, either twisted together or not. Thus in one embodiment there may be an assembly in which the elementary monofilaments are substantially parallel to one another. In another embodiment there may equally be an assembly in which the elementary monofilaments are wound helically. In a further embodiment each filar stiffening element consists of an elementary monofilament. Each elementary monofilament has a diameter from 5 μm to 0.80 mm.

In a first variant each textile filar stiffening element comprises one or more multifilament plies each comprising a plurality of monofilaments having a diameter from 5 μm to 20 μm. In this first variant the number of monofilaments of each multifilament ply will generally be from 100 to 10000. In order to limit leakage of the inflation gas via capillaries present between the monofilaments of the textile filar stiffening elements according to this first variant, each textile filar stiffening element may advantageously be sheathed, for example by means of one or more polymer compositions well known to the person skilled in the art, in order to plug its capillaries. In a second variant each textile filar stiffening element comprises a multifilament ply comprising a plurality of monofilaments wound helically and each having a diameter from 0.10 mm to 0.80 mm. In this second variant the number of monofilaments is generally from 2 to 10. In this second variant the number of capillaries between the monofilaments being low, there is no utility in sheathing the textile filar stiffening element even though that may be envisaged, of course.

Each textile filar stiffening element is conventionally coated with at least one aqueous adhesive compound, for example an RFL type glue or as described in the documents WO2013017422, WO2017168107.

In another embodiment each filar stiffening element is made of metal, for example an assembly of metal monofilaments, each metal monofilament having a diameter typically less than 50 μm, for example 10 μm. In one embodiment each filar stiffening element comprises an assembly consisting of a plurality of metal monofilaments. In another embodiment each filar stiffening element consists of a metal monofilament.

In a variant enabling manufacture of the tyre using a relatively simple method, the or each filar stiffening element or the or each of the first and second stiffening elements advantageously extends continuously in the toroidal cavity from the sidewall or the bead to the crown in a main direction forming with the circumferential direction of the tyre an angle from 85° to 90° absolute value. In another variant enabling the tyre to be manufactured using a more complex method but enabling the circumferential stiffness to be increased, the or each filar stiffening element extends continuously in the toroidal cavity from the sidewall or the bead as far as the crown in a main direction forming with the circumferential direction of the tyre an angle from 45° to 75° absolute value, as explained in particular in WO2020128225.

In one configuration applicable to the first and second embodiments, each of the first and second radially inner reinforcing structures and/or the or each radially outer reinforcing structure comprises at least one filar reinforcing element extending in a main direction forming with the circumferential direction of the tyre an angle less than or equal to 10°, preferably less than or equal to 5° and more preferably substantially zero.

The tyre has a substantially toroidal shape around an axis of revolution, the filar reinforcing element of each of the first and second radially inner reinforcing structures is optionally wound circumferentially over at most two complete turns, preferably over at most one complete turn about the axis of revolution.

It could therefore be envisaged that the filar reinforcing element of the radially inner reinforcing structure be a ring with no free ends either because they are butt-jointed, for example by a sleeve, or because the ring is monolithic. Having the filar reinforcing element of the radial inner reinforcing structure have two free ends could also be envisaged.

The filar reinforcing element of the radially inner circular structure is preferably made of metal. In some embodiments this advantageously enables use of a metal filar reinforcing element identical to that used to manufacture the circumferential reinforcing element.

The tyre having a substantially toroidal shape around an axis of revolution, the filar reinforcing element of the or each radially outer reinforcing structure is optionally wound circumferentially over at least two complete turns around the axis of revolution and at most ten complete turns around the axis of revolution.

It would therefore be possible to envisage that the filar reinforcing element of the radially inner reinforcing structure be a ring with no free ends either because they are butt-jointed, for example by a sleeve, or because the ring is monolithic. It could also be envisaged that the filar reinforcing element of the radially inner reinforcing structure have two free ends.

The filar reinforcing element of the radially outer circular structure is a textile structure. This makes it possible to avoid localised stiffening of the crown. Correct flattening of the tread is therefore preserved, as opposed to the situation in which the filar reinforcing element of the radially outer circular structure is made of metal. Textile filar reinforcing elements showing a relatively low thermal contraction will be preferred.

In each of the first and second embodiments, the or each stiffening element or the or each of the first and second stiffening elements is optionally wound at least in part around the or each filar reinforcing element.

By virtue of being wound at least in part around the filar reinforcing element, the direction in which the stiffening element extends in the toroidal cavity is not colinear with the direction in which the stiffening element extends in the sidewall or the bead and in the crown.

In a variant of the or each radially inner reinforcing structure and/or the or each radially outer reinforcing structure, the or each radially inner reinforcing structure and/or the or each radially outer reinforcing structure comprise a woven, knitted or non-woven fabric, preferable a woven or knitted fabric.

The or each stiffening element or the or each of the first and second stiffening elements preferably passes through the woven, knitted or non-woven fabric, preferably through the woven or knitted fabric of each of the first and second radially inner reinforcing structures and/or the or each radially outer reinforcing structure.

In a further variant of the or each radially inner reinforcing structure, the tyre comprises a carcass reinforcement anchored in each bead and extending in each sidewall, each of the first and second radially inner reinforcing structures comprises a portion of the carcass reinforcement extending radially in the sidewall and/or the bead.

In a further variant of the or each radially outer reinforcing structure, the tyre comprises a carcass reinforcement extending axially in the crown, the or each radially outer reinforcing structure comprises a portion of the carcass reinforcement extending axially in the crown.

Thus in one embodiment the carcass reinforcement comprising carcass filar reinforcing elements, the or each stiffening element is wound at least in part around one or more of the carcass filar reinforcing elements of the portion of the carcass reinforcement extending radially in the sidewall and/or the bead and/or the portion of the carcass reinforcement extending axially in the crown.

BRIEF DESCRIPTION OF THE FIGURES

Following the generic description that has just been given, the invention will be better understood on reading the following detailed description given by way of non-limiting example only and with reference to the drawings, in which:

FIG. 1, comprising

In the figures relating to the tyre there has been represented a system of axes X, Y, Z corresponding to the usual axial direction (Y), radial direction (Z) and circumferential direction (X), respectively, of a tyre.

Figures 1A, 1B, 1C:
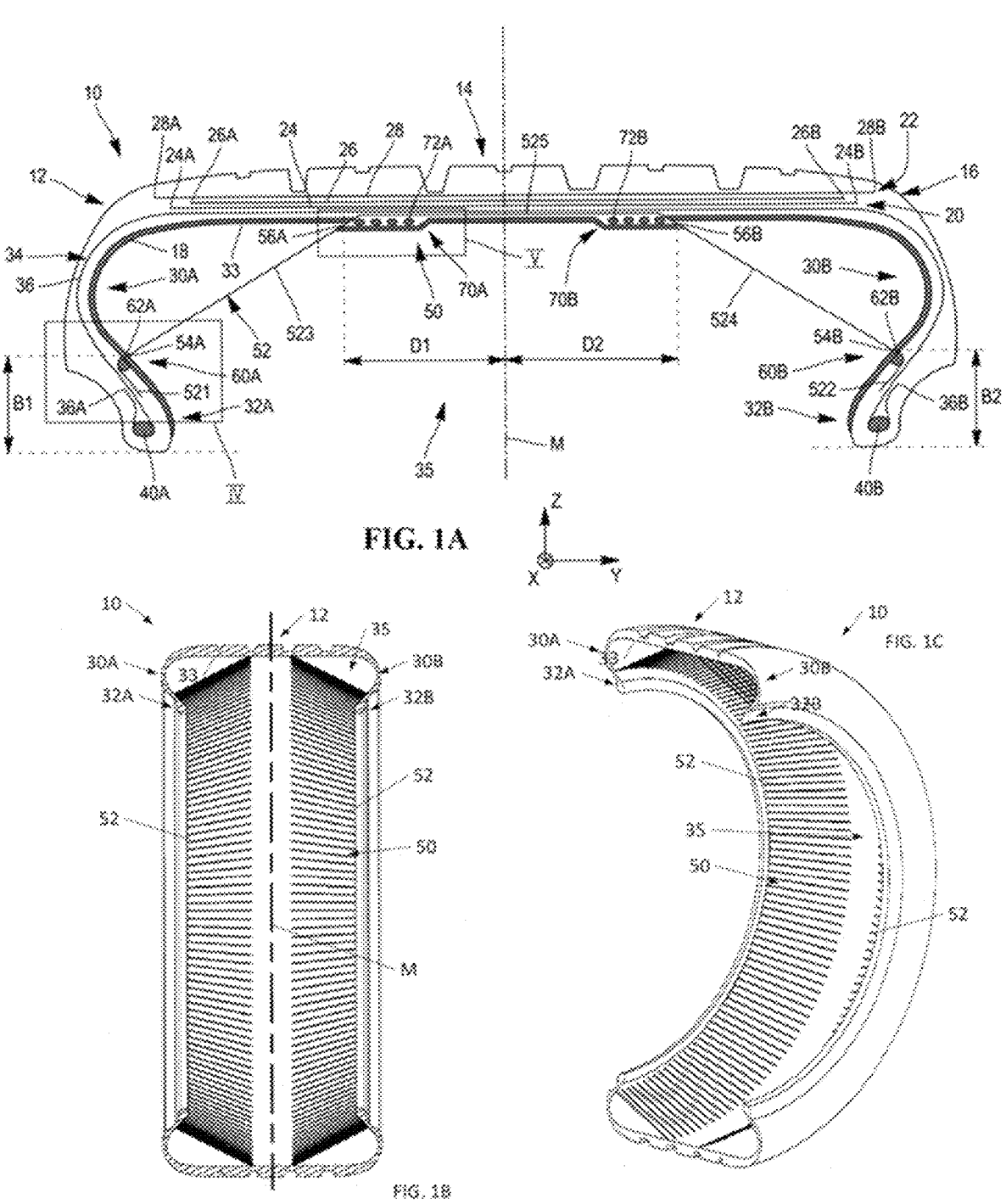
FIGS. 1A, 1B, 1C, depicts a tyre in accordance with a first embodiment of the invention, FIG. 1A being a view in a meridian section plane parallel to the axis of rotation of the tyre, FIGS. 1B and 1C being views of the interior of the tyre in different directions.

A tyre conforming to the invention and designated by the general reference 10 has been represented in FIGS. 1A, 1B, 1C. The tyre 10 has a substantially toroidal shape about an axis of revolution substantially parallel to the axial direction Y The tyre 10 is intended for a passenger vehicle and has a dimension 275/35ZR19. The tyre 10 is represented in the various figures in the new state, that is to say as yet unused.

The tyre 10 includes a crown 12 including a tread 14 intended to come into contact with the ground when rolling and a crown reinforcement 16 extending in the crown 12 in the circumferential direction X. The tyre 10 also includes a layer 18 gastight for an inflation gas.

The crown reinforcement 16 comprises a working reinforcement 20 and a wrapping reinforcement 22. The working reinforcement 20 comprises at least one working layer and here comprises two working layers 24, 26. In this instance the working reinforcement 20 consists of two working layers 24, 26. The radially inner working layer 24 is arranged radially inside the radially outer working layer 26.

The wrapping reinforcement 22 comprises at least one wrapping layer and here comprises a wrapping layer 28. Here the wrapping reinforcement 22 consists of the wrapping layer 28.

The crown reinforcement 16 is surmounted radially by the tread 14. Here the wrapping reinforcement 22, here the wrapping layer 28, is arranged radially outside the working reinforcement 20 and is therefore radially interleaved between the working reinforcement 20 and the tread 14.

The tyre 10 comprises first and second sidewalls 30A, 30B extending the crown 12 radially inwards. The second sidewall 30B is situated on the other side of the median plane M to the first sidewall 30A. The tyre 10 further includes first and second beads 32A, 32B respectively extending each first and second sidewalls 30A, 30B radially inwards. The second bead 32B is situated on the other side of the median plane M to the first bead 32A. Each of the first and second sidewalls 30A, 30B connects each first and second bead 32A, 32B respectively to the crown 12. An internal surface 33 intended to be in contact with the inflation gas of the tyre 10 delimits a toroidal inflation cavity 35 of the tyre. Here the internal surface 33 is borne by the gastight layer 18. Each of the first and second beads 32A, 32B respectively comprises first and second circumferential reinforcing elements 40A, 40B, here a bead wire enabling attachment of the tyre 10 onto a mounting support of the tyre 10, for example a rim.

The tyre 10 comprises a carcass reinforcement 34 anchored in each of the first and second beads 32A, 32B, and in this instance is wound around each of the first and second circumferential reinforcing elements 40A, 40B. The carcass reinforcement 34 extends radially in each sidewall 30 and radially inside the axial crown reinforcement 16 in the crown 12. The crown reinforcement 16 is arranged radially between the tread 14 and the carcass reinforcement 34. The carcass reinforcement 34 comprises at least one carcass layer and here comprises only one carcass layer 36. In this instance the carcass reinforcement 34 consists of the only carcass layer 36.

Figure 2:
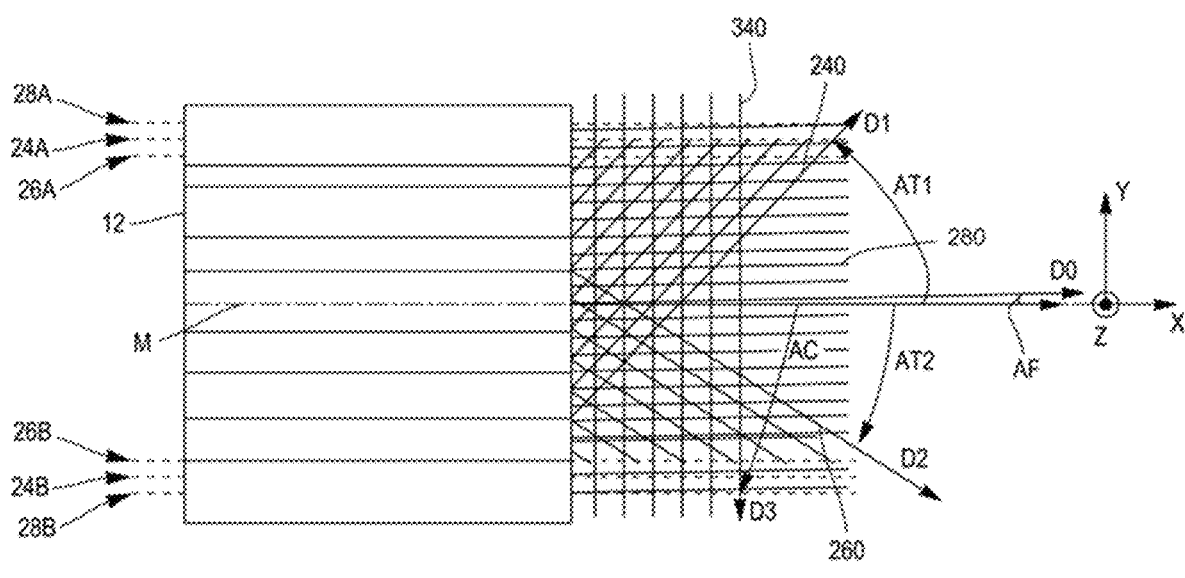
FIG. 2 is a cutaway view of the tyre from FIG. 1 depicting the arrangement of the filar reinforcing elements in the crown.

Each of the working layers 24, 26, the wrapping layer 28 and the carcass layer 36 comprise an elastomer matrix in which are embedded one or more filar reinforcement elements of the corresponding layer. These layers are described next with reference to FIG. 2.

The wrapping reinforcement 22, here the wrapping layer 28, is delimited axially by two axial edges 28A, 28B of the wrapping reinforcement 22. The wrapping reinforcement 22 comprises one or more wrapping filar reinforcing elements 280 wound circumferentially and helically so as to extend axially from the axial edge 28A to the other axial edge 28B of the wrapping layer 28 in a main direction DO of each wrapping filar reinforcing element 280. The main direction DO forms with the circumferential direction X of the tyre 10 an angle AF with absolute value less than or equal to 10°, preferably less than or equal to 7° and more preferably less than or equal to 5°. Here AF=−5°.

The radially inner working layer 24 is delimited axially by two axial edges 24A, 24B. The radially inner working layer 24 comprises working filar reinforcing elements 240 extending axially from the axial edge 24A to the other axial edge 24B substantially parallel to one another in a main direction D1. In an analogous manner the radially outer working layer 26 is delimited axially by two axial edges 26A, 26B. The radially outer working layer 26 comprises working filar reinforcing elements 260 extending axially from the axial edge 26A to the other axial edge 26B substantially parallel to one another in a main direction D2. The main direction D1 in which each working filar reinforcement element 240 of the radially inner working layer 24 extends and the main direction D2 in which each working filar reinforcing element 260 of the other radially outer working layer 26 extends form with the circumferential direction X of the tyre 10 respective angles AT1 and AT2 with opposite orientations. Each main direction D1, D2 forms with the circumferential direction X of the tyre 10 a respective angle AT1, AT2 with absolute value strictly greater than 10°, preferably from 15° to 50° and more preferably from 15° to 30°. Here AT1=−26° and AT2=+26°.

The carcass layer 36 is delimited axially by two axial edges 36A, 36B. The carcass layer 36 comprises carcass filar reinforcing elements 340 extending axially from the axial edge 36A to the other axial edge 36B of the carcass layer 36 in a main direction D3 forming with the circumferential direction X of the tyre 10 an angle AC with absolute value greater than or equal to 60°, preferably from 80° to 90°, and here AC=+90°.

Each wrapping filar reinforcing element 280 conventionally comprises two multifilament plies comprising a multifilament ply consisting of an aliphatic polyamide monofilament ply, here of nylon with denier equivalent to 140 tex and a multifilament ply consisting of an aromatic polyamide monofilament ply, here of aramide with a denier equivalent to 167 tex, these two multifilament plies being advantageously coiled at 290 turns per metre in one direction and then coiled together at 290 turns per metre in the opposite direction. These two multifilament plies are wound helically around one another. Obviously, any other wrapping filar reinforcing element known to the person skilled in the art could be used.

Each working filar reinforcing element 240, 260 is an assembly of four steel monofilaments comprising an internal layer of two steel monofilaments initially wound helically with an infinite pitch and an outer layer of two steel monofilaments initially wound helically with a pitch of 14.3 mm in one direction, the four monofilaments then being wound at the pitch of 14.3 mm in the opposite direction, each steel monofilament having a diameter equal to 0.26 mm. In another variant each working filar reinforcing element 240, 260 consists of a steel monofilament having a diameter equal to 0.30 mm. In a further variant each working filar reinforcing element is an assembly of two monofilaments wound helically together having a diameter equal to 0.30 mm. More generally, the steel monofilaments have diameters from 0.25 mm to 0.32 mm. Obviously, any other working filar reinforcing element known to the person skilled in the art could be used.

Each carcass filar reinforcing element 340 conventionally comprises two multifilament plies, each multifilament ply consisting of a polyester, here PET, monofilament ply, these two multifilament plies being wound helically and individually at 270 turns per metre in one direction and then coiled helically together at 270 turns per metre in the opposite direction. Each of these multifilament strands has a denier equivalent to 334 tex. In other variants deniers equivalent to 144 tex and twists equal to 420 turns per metre or deniers equivalent to 220 tex and twists equal to 240 turns per metre could be used.

Referring to FIG. 1A, the tyre 10 comprises a stiffening structure 50 comprising a plurality of stiffening elements 52 extending continuously in the toroidal cavity 35. The stiffening elements 52 are distributed circumferentially in the toroidal cavity 35. The stiffening elements 52 are distributed circumferentially with a repetition angular pitch preferably between 1 degree and 5 degrees inclusive, preferably between 1 degree and 3 degrees inclusive. Depending on the dimensions of the tyre 10, the stiffening structure 50 therefore has between 72 and 360 stiffening elements 52, preferably between 120 and 360 stiffening elements 52, and here 240 stiffening elements 52. The number of stiffening elements 52 makes it possible to achieve a good trade-off between a number of stiffening elements 52 that is on the one hand sufficiently high to obtain effective stiffening of the tyre 10 and on the other hand sufficiently moderate to be able to arrange a corresponding number of passages 1500 in the core 1000 without excessively weakening the structure of the core 1000 or complicating extraction from the mould, as explained hereinafter.

Each stiffening element 52 is a textile filar stiffening element, consisting here of an assembly of three polyester, here PET, multifilament plies, these three multifilament plies being individually wound at 220 turns per metre in one direction and then wound together at 220 turns per metre in the opposite direction. Each of these multifilament plies has a denier equivalent to 220 tex.

Each filar stiffening element 52 extends continuously from the first sidewall 30A and/or the first bead 32A as far as the second sidewall 30B and/or the second bead 32B in the crown 12 and here from the first sidewall 30A as far as the second sidewall 30B in the crown 12. The main direction in which each stiffening element 52 extends in the toroidal cavity 35 forms with the circumferential direction X an angle in absolute value from 85° to 90°.

The stiffening structure 50 also comprises radially inner first and second reinforcing structures 60A, 60B respectively in the first and second sidewalls 30A, 30B and/or the first and second beads 32A, 32B, and here respectively in each of the first and second sidewalls 30A, 30B. Each of the radially inner first and second reinforcing structures 60A, 60B is respectively distinct from each of the first and second circumferential reinforcing elements 40A, 40B situated on the same side of the median plane as each of the first and second sidewalls 30A, 30B, respectively. In this instance each of the radially inner first and second reinforcing structures 60A, 60B is respectively arranged radially outside each of the first and second circumferential reinforcing elements 40A, 40B.

Figure 3:
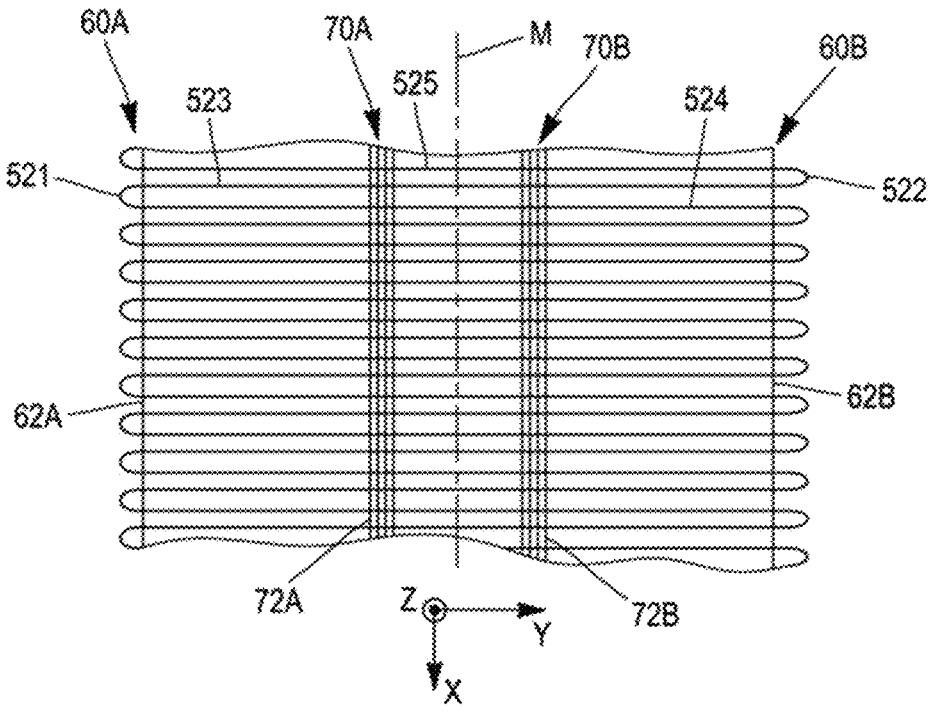
FIG. 3 is a diagram depicting the arrangement of the stiffening structure of the tyre from FIG. 1, FIGS. 4 and 5 are detail views of the zones IV and V in FIG. 1A, respectively.
Figure 4:
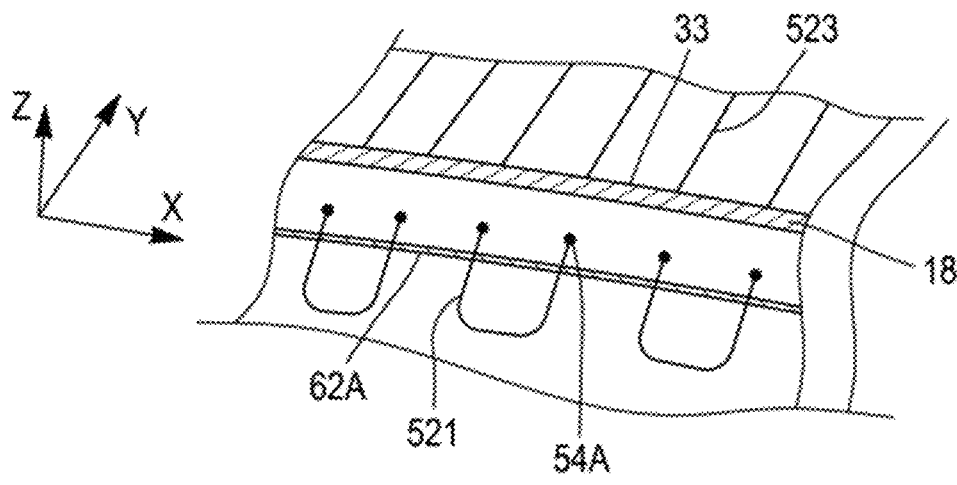

Each of the radially inner first and second reinforcing structures 60A, 60B respectively comprises first and second metal filar reinforcing elements 62A, 62B here comprising an assembly of an inner layer of four 0.35 mm metal elementary monofilaments wound helically at the pitch of 5 mm and an outer layer of 0.35 mm metal elementary monofilaments wound helically around the internal layer at the pitch of 10 mm. Each filar reinforcing element 62A, 62B extends in a main direction forming with the circumferential direction X an angle less than or equal to 10°, preferably less than or equal to 5° and here substantially zero, as can be seen in FIGS. 3 and 4. Each of the first and second filar reinforcing elements 62A, 62B of each of the first and second radially inner reinforcing structures 60A, 60B is wound circumferentially over at most two complete turns and here over at most one complete turn around the axis of revolution Y.

In order to ensure optimum anchoring of each stiffening element 52, each of the first and second radially inner reinforcing structures 60A, 60B has relatively high stiffness in extension and in flexing. Moreover, and still with the aim of optimising the anchoring of each stiffening element 52, each of the first and second radially inner reinforcing structures 60A, 60B is buried in a mass of one or more, preferably elastomer, materials, the nominal secant modulus at 10% extension is greater than or equal to 20 MPa, preferably to 30 MPA and here equal to 56 MPa. The measurement is effected in accordance with French standard NF T 46-002 of September 1988. There is measured in second elongation (that is to say after accommodation) the calculated nominal secant modulus with respect to the initial section of the test specimen (or apparent stress in MPa) at 10% elongation. This measurement in tension is effected under normal conditions of temperature (23±2° C.) and of relative humidity (50±5%) in accordance with French standard NF T 40-101 (December 1979).

The stiffening structure 50 further comprises first and second radially outer reinforcing structures 70A, 70B in the crown 12. The first and second radially outer reinforcing structures 70A, 70B are arranged axially on either side of the median plane M of the tyre 10 and here substantially symmetrically with respect to the median plane M of the tyre 10. Each of the radially outer reinforcing structures 70A, 70B is arranged radially inside the carcass reinforcement 34.

Figure 5:
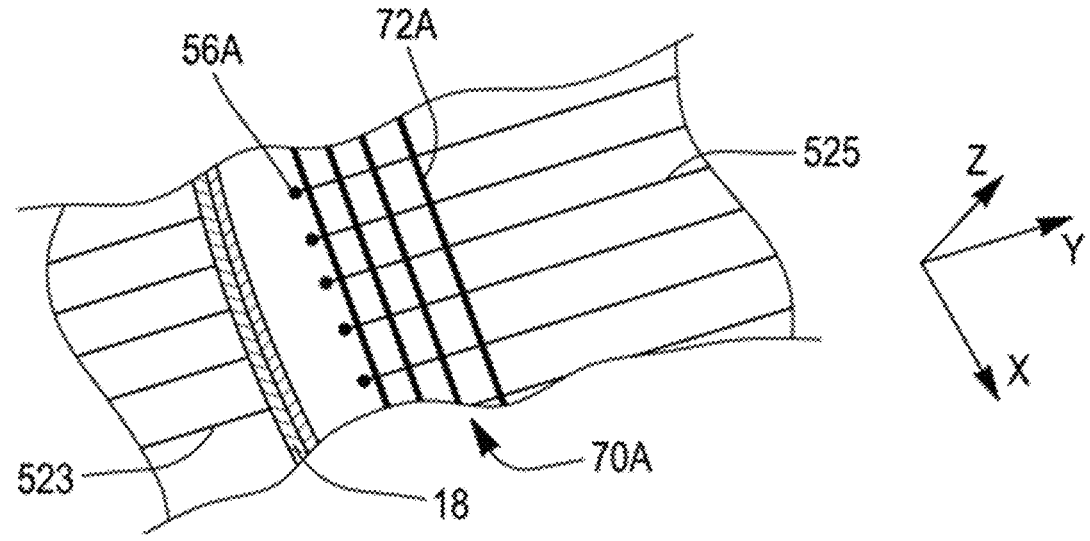

The first and second radially outer reinforcing structures 70A, 70B respectively comprise first and second textile filar reinforcing elements 72A, 72B here comprising an assembly of two multifilament plies each consisting of an aromatic polyamide monofilament ply here of aramide with a denier equivalent to 330 tex, and a multifilament ply consisting of an aliphatic polyamide monofilament ply, here of nylon with a denier equivalent to 188 tex, each of the multifilament plies being individually coiled helically at 270 turns per metre in one direction and then coiled helically together at 270 turns per metre in the opposite direction. These three multifilament strands are helically wound one around the other. Each of the filar forcing elements 72A, 72B extends in a main direction forming with the circumferential direction X an angle less than or equal to 10°, preferably less than or equal to 5°, and here substantially zero, as can be seen in FIGS. 3 and 5. Each of the first and second filar reinforcing elements 72A, 72B of each of the first and second radially outer reinforcing structures 70A, 70B is wound circumferentially over at least two complete turns and at most ten complete turns about the axis of revolution Y, and here over four complete turns about the axis of revolution.

In order to ensure optimum anchoring of each stiffening element 52, each of the first and second radially outer reinforcing structures 70A, 70B has a stiffness in extension that is relatively high and a stiffness in flexing that is relatively low in order to limit overwrapping of the crown 12 and not to risk deterioration of the flattening of the tread 14. Moreover, still with the aim of optimising the anchoring of each stiffening element 52, each of the first and second radially outer reinforcing structures 70A, 70B is buried in a mass of one or more, preferably elastomer, materials the nominal secant modulus of which at 10% elongation is greater than or equal to 2.5 Mpa, preferably less than or equal to 15 MPa, more preferably less than or equal to 10 MPa and even more preferably less than or equal to 5 Mpa, and here equal to 3 MPa.

Each stiffening element 52 is anchored in the first sidewall 30A around the first radially inner reinforcing structure 60A and in the second sidewall 30B around the second radially inner reinforcing structure 60B. Here each stiffening element 52 is wound at least in part around each of the first and second filar reinforcing elements 62A, 62B. Each stiffening element 52 is also anchored, in the crown 12, around each of the first and second radially outer reinforcing structures 70A, 70B. Here each stiffening element 52 is wound at least in part around each of the first and second filar reinforcing elements 72A, 72B.

Each stiffening element 52 passes through the internal surface 33 at a first radially inner anchor point 54A to be anchored around the first radially inner reinforcing structure 60A and a first radially outer anchor point 56A to be anchored around the first radially outer reinforcing structure 70A. The stiffening element 52 passes through the internal surface 33 at a second radially inner anchor point 54B to be anchored around the second radially inner reinforcing structure 60B and at a second radially outer anchor point 56B to be anchored around the second radially outer reinforcing structure 70B.

Accordingly, each stiffening element 52 comprises portions 521, 522 respectively buried in each sidewall 30A, 30B, first and second portions 523, 524 extending in the toroidal cavity 35 respectively between the first radially inner anchor point 54A and radially outer anchor point 56A and between the second radially inner anchor point 54B and radially outer anchor point 56B as well as a portion 525 buried in the crown 12 between the first and second portions 523, 524.

In order to ensure optimal anchoring of each stiffening element, each portion 521, 522 has a relatively long length, here greater than or equal to 20 mm, and is coupled to a length greater than or equal to 1 mm of each of the radially inner reinforcing structures 60A, 60B.

As depicted in FIG. 1A the first radially outer anchor point 56A is axially on the same side as the first radially inner anchor point 54A and the first radially inner structure 60A relative to the median plane M. The second radially outer anchor point 56B is axially on the same side as the second radially inner anchor point 54B and the second radially inner structure 60B relative to the median plane M. Each of the first and second radially inner anchor points 54A, 54B and the first and second radially outer anchor points 56A, 56B is arranged so that the first and second portions 523, 524 do not cross over in the toroidal cavity 35.

Each of the first and second radially outer anchor points 56A, 56B is at a respective axial distance D1, D2 at most equal to 0.45×SW, preferably from 0.05×SW to 0.45×SW, from the median plane M of the tyre 10, SW being the nominal section width of the tyre 10. The nominal section width is as defined in the manual of the ETRTO 2020 standard and can in particular be seen in the markings applied to at least one of the sidewalls 30A, 30B of the tyre 10 in the form SW/AR α V U β where SW designates the nominal section width, AR designates the nominal aspect ratio, a designates the structure and is either R or ZR, V designates the nominal rim diameter, U designates the load index and p designates the speed symbol. Here D1=D2=45 mm.

Each of the first and second radially inner anchor points 54A, 54B is at a respective radial distance B1, B2 from 0.10×H to 0.50×H, preferably from 0.10×H to 0.35×H, from the radially innermost point of the tyre 10, H being the section height of the tyre defined by H=SW×AR/100 where SW is the nominal section width and AR is the nominal aspect ratio of the tyre in accordance with manual of the the ETRTO 2020 standard. The nominal section width SW and the nominal aspect ratio AR are those in the dimensions marking on the sidewall of the tyre and conform to the manual of the ETRTO 2020 standard. Here B1=B2=30 mm.

As is depicted in FIGS. 3 and 4, the stiffening elements 52 form a continuous stiffening element so as to trace out a boustrophedon path between the first sidewall 30A and the second sidewall 30B in the crown 12. Alternatively, separate and therefore discontinuous stiffening elements 52 could equally well be envisaged.

Figure 6:
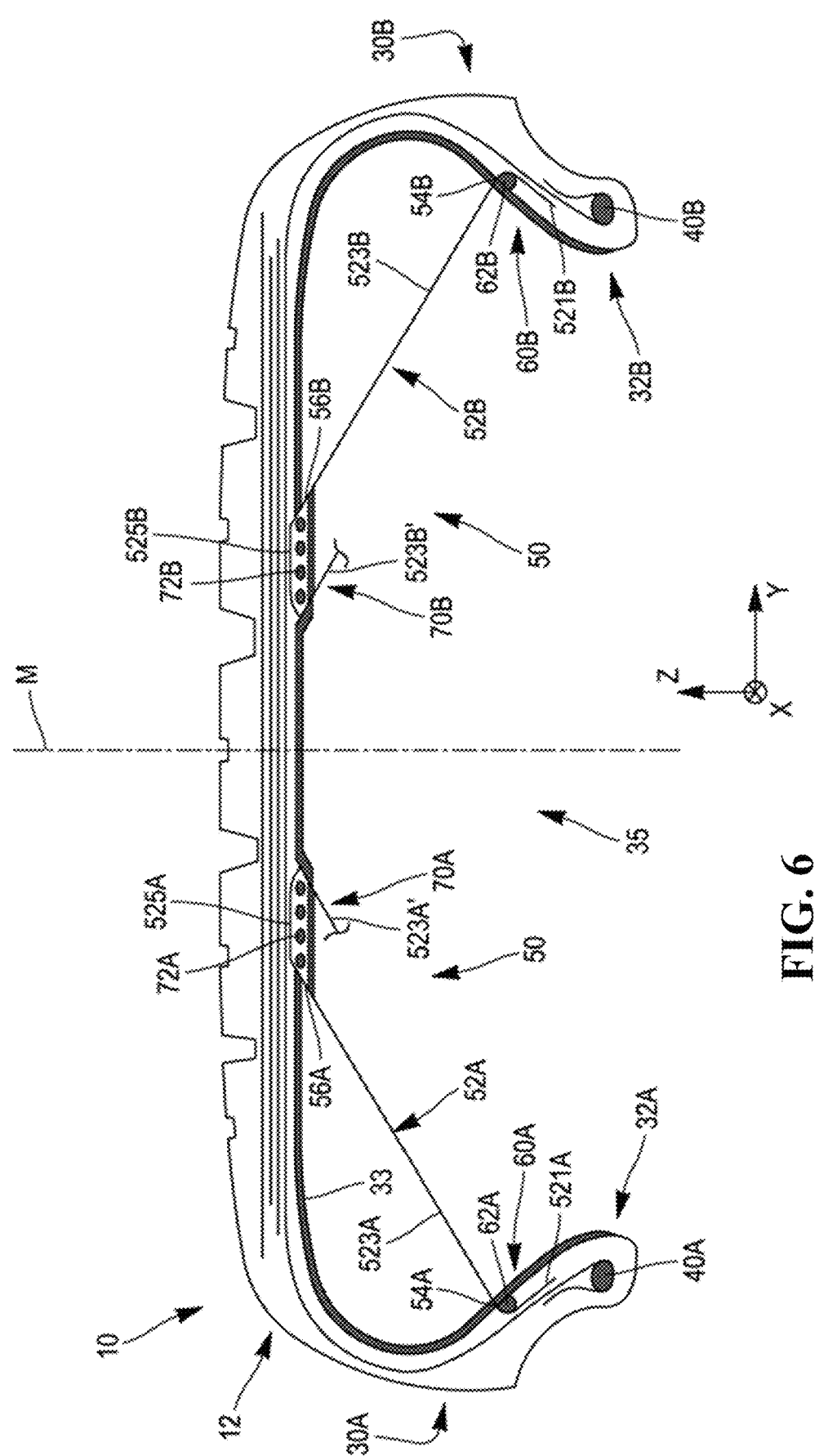
FIGS. 6 to 10 are views analogous to that of FIG. 1A of tyres in accordance with second, third, fourth, fifth and sixth embodiments, respectively.

There has been represented in FIG. 6 a tyre in accordance with a second embodiment of the invention. Elements analogous to those of the tyre in accordance with the first embodiment are designated by identical references.

Unlike the tyre in accordance with the first embodiment, the stiffening structure 50 of the tyre 10 in accordance with the second embodiment comprises first and second stiffening elements 52A, 52B distinct from one another. Each first stiffening element 52A is anchored around the first radially inner reinforcing structure 60A arranged in the first sidewall 30A and around the first radially outer reinforcing structure 70A arranged in the crown 12. Each second stiffening element 52B is anchored around a second radially inner reinforcing structure 60B arranged in the second sidewall 30B and around the second radially outer reinforcing structure 70B arranged in the crown 12 so that each first stiffening element 52A extends continuously in the toroidal cavity 35 from the first sidewall 30A as far as the crown 12 and so that each second stiffening element 52B extends continuously in the toroidal cavity 35 from the second sidewall 30B to the crown 12.

The first stiffening elements 52A form a first continuous stiffening element so as to trace out a boustrophedon path between the first sidewall 30A and the crown 12. The second stiffening elements 52B form a second continuous stiffening element so as to trace out a boustrophedon path between the first sidewall 30B and the crown 12.

Each of the first and second stiffening elements 52A, 52B comprises first and second portions 521A, 521B respectively buried in the first and second sidewalls 30A, 30B, first and second portions 523A, 524B extending in the toroidal cavity 35 respectively between the first radially inner anchor point 54A and the first radially exterior anchor point 56A and between the second radially inner anchor point 54B and the second radially outer anchor point 56B, as well as first and second portions 525A, 525B buried in the crown 12. For clarity there has been represented in FIG. 6 a part of each of the first and second portions 523A', 523B' of stiffening elements 52A', 52B' continuous with each of the first and second stiffening elements 52A, 52B but outside the meridian plane of FIG. 6.

Just as in the first embodiment, the first radially outer anchor point 56A is axially on the same side as the first radially inner anchor point 54A and as the first radially inner structure 60A relative to the median plane M. The second radially outer anchor point 56B is arranged on the same side as the second radially inner anchor point 54B and as the second radially inner structure 60B relative to the median plane M. Each of the first and second radially inner anchor points 54A, 54B and radially outer anchor points 56A, 56B is arranged so that the first and second portions 523A, 523B do not cross over in the toroidal cavity 35. In a variant of the second embodiment that is not represented there could be envisaged an embodiment analogous to the second embodiment but in which the stiffening structure 50 does not comprise two radially outer reinforcing structures but a single radially outer reinforcing structure, as is the case for the third embodiment described hereinafter.

Figure 7:
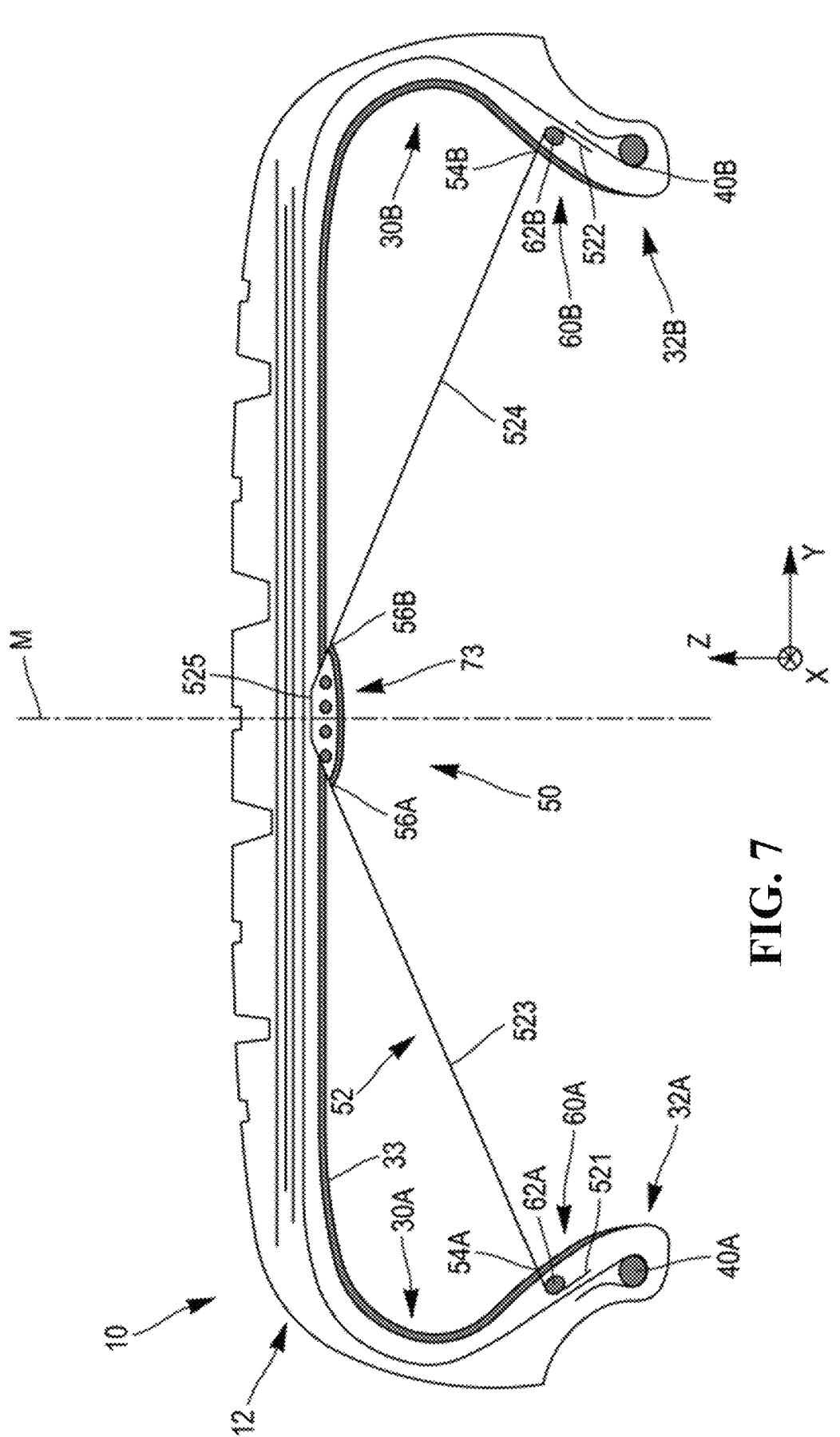

There has been represented in FIG. 7 a tyre in accordance with a third embodiment of the invention. Elements analogous to those of the tyres in accordance with the previous embodiments are designated by identical references.

Unlike the tyre in accordance with the first embodiment, the stiffening structure of the tyre 10 in accordance with the second embodiment comprises a single radially outer reinforcing structure 73. Each stiffening element 52 is anchored around the first radially inner reinforcing structure 60A, around the radially outer reinforcing structure 73 in the crown 12 and around the second radially inner reinforcing structure 60B so that each stiffening element 52 extends continuously from the first sidewall 30A to the second sidewall 30B in the crown 12.

Figure 8:
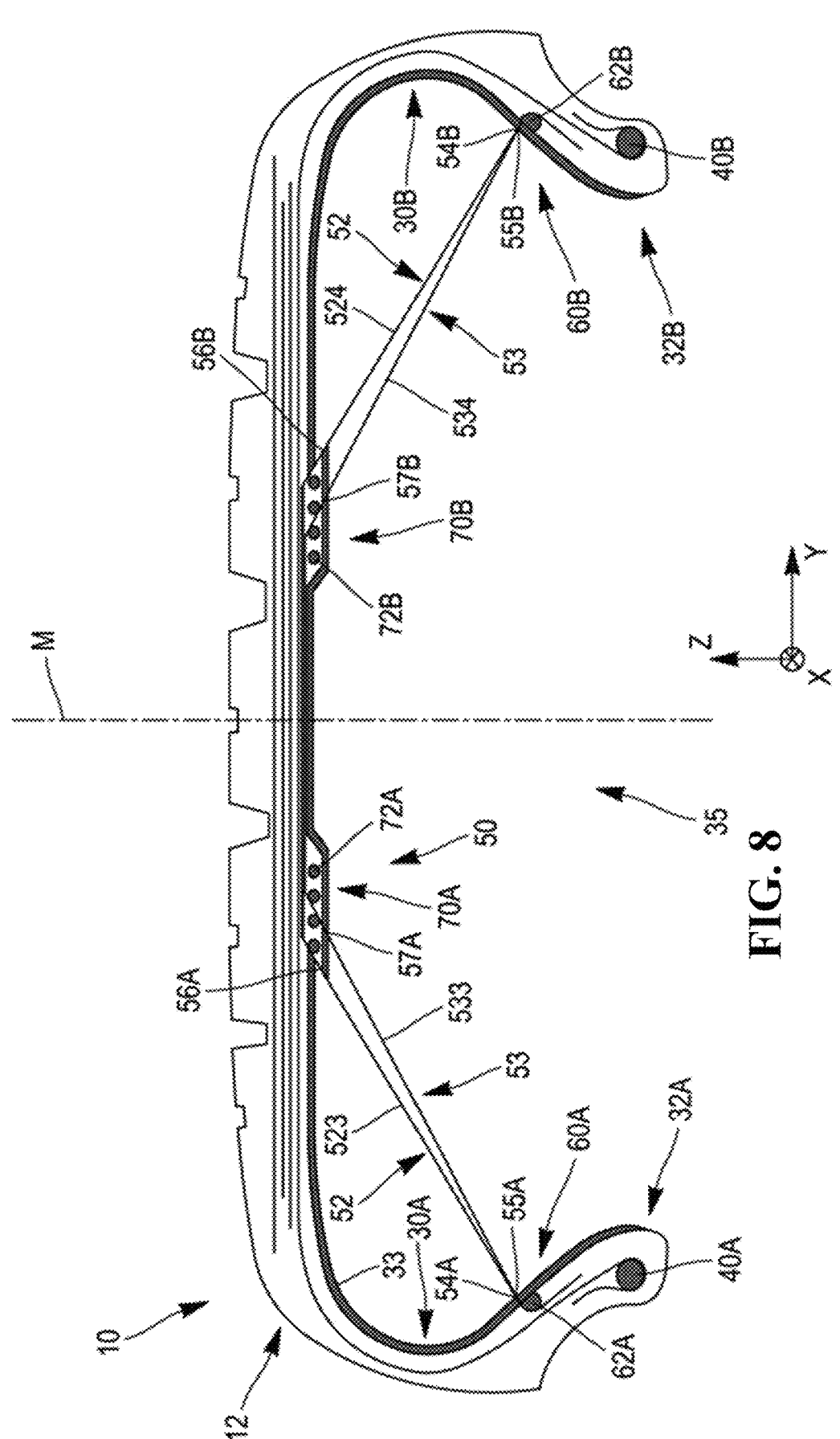

There has been represented in FIG. 8 a tyre in accordance with a fourth embodiment of the invention. Elements analogous to those of the tyres in accordance with the previous embodiments are designated by identical references.

Unlike the first embodiment, the stiffening structure 50 comprises axially outer anchor stiffening elements 52 and axially inner anchor stiffening elements 53. The stiffening structure 52 comprises first and second radially outer reinforcing structures 70A, 70B arranged on either side of and substantially symmetrical with respect to the median plane M. Each axially outer anchor stiffening element 52 is anchored around the first radially inner reinforcing structure 60A, around the first and second radially outer reinforcing structure 70A, 70B and around the second radially inner reinforcing structure 60B so that each axially outer anchor stiffening element 52 extends continuously from the first sidewall 30A to the second sidewall 30B in the crown 12. Each axially outer anchor stiffening element 52 comprises a first portion 523 extending in the toroidal cavity 35 between a first radially inner anchor point 54A at which each axially outer anchor stiffening element 52 passes through the internal surface 33 to be anchored around the first radially inner reinforcing structure 60A and a first radially outer anchor point 56A at which each axially outer anchor stiffening element 52 passes through the internal surface 33 to be anchored around the first and second radially outer reinforcing structures 70A, 70B. Each axially outer anchor stiffening element 52 comprises a second portion 524 extending in the toroidal cavity 35 between a second radially inner anchor point 54B at which each axially outer anchor stiffening element 52 passes through the internal surface 33 to be anchored around the second radially inner reinforcing structure 60B and a second radially outer anchor point 56B at which each axially outer anchor stiffening element 52 passes through the internal surface 33 to be anchored around the first and second radially outer reinforcing structures 70A, 70B.

Each axially inner anchor stiffening element 53 is anchored around the first radially inner reinforcing structure 60A, around the first and second radially outer reinforcing structures 70A, 70B and around the second radially inner reinforcing structure 60B so that each second stiffening element 53 extends continuously from the first sidewall 30A as far as the second sidewall 30B in the crown 12. Each axially inner anchor stiffening element 53 comprises a first portion 533 extending in the toroidal cavity 35 between a first radially inner anchor point 55A at which each axially inner anchor stiffening element 53 passes through the internal surface 33 to be anchored around the first radially inner reinforcing structure 60A and a first radially outer anchor point 57A at which each axially inner anchor stiffening element 53 passes through the internal surface 33 to be anchored in the first and second radially outer reinforcing structures 70A, 70B. Each axially inner anchor stiffening element 53 comprises a second portion 534 extending in the toroidal cavity 35 between a second radially inner anchor point 55B at which each axially inner anchor stiffening element 53 passes through the internal surface 33 to be anchored around the second radially inner reinforcing structure 60B and a second radially outer anchor point 57B at which each axially inner anchor stiffening element 53 passes through the internal surface 33 to be anchored in the first and second radially outer reinforcing structures 70A, 70B.

In a manner analogous to the first embodiment each of the first and second radially inner anchor points 54A, 55A, 54B, 55B and the first and second radially outer anchor points 56A, 57A, 56B, 57B of each axially inner anchor stiffening element 53 and axially outer anchor stiffening element 52 is arranged so that the portion 533 and the portion 534 do not cross over in the toroidal cavity, the portion 523 and the portion 524 not crossing over in the toroidal cavity, the first radially outer anchor points 56A, 57A and the first radially inner anchor points 54A, 55A are axially on the same side of the median plane of the tyre and the second radially outer anchor points 56B, 57B and second radially inner anchor points 54B, 55B are axially arranged on the same other side of the median plane of the tyre.

Each of the first and second radially outer anchor points 57A, 57B of each axially inner anchor stiffening element 53 is axially and respectively inside each of the first and second radially outer anchor points 56A, 56B of each axially outer anchor stiffening element 52.

It will be noted that each first radially inner anchor point 55A and each first radially inner anchor point 54A are radially and axially aligned with the same circumferential line. In an analogous manner each second radially inner anchor point and each second radially inner anchor point 54B are radially and axially aligned on the same circumferential line.

It will also be noted that each of the first and second radially inner and outer anchor points 55A, 55B, 57A, 57B is in the same meridian section plane as each of the first and second radially inner anchor points and the first and second radially outer anchor points 54A, 54B, 56A, 56B. In a variant that is not depicted it could equally well be envisaged that each of the first and second radially inner and outer anchor points 55A, 55B, 57A, 57B is in a different meridian section plane than each of the first and second radially inner and outer anchor points 54A, 54B, 56A, 56B.

In this fourth embodiment each of the first and second radially inner anchor reinforcing structures 60A, 60B of each axially inner anchor stiffening element 53 is each of the first and second radially inner anchor reinforcing structures 60A, 60B of each axially outer anchor stiffening element 52. Moreover, the first and second radially outer anchor reinforcing structures 70A, 70B of each axially inner anchor stiffening element 53 are the radially outer anchor reinforcing structures 70A, 70B of each radially outer anchor stiffening element 52. In a variant, it could be envisaged that they are distinct.

Figure 9:
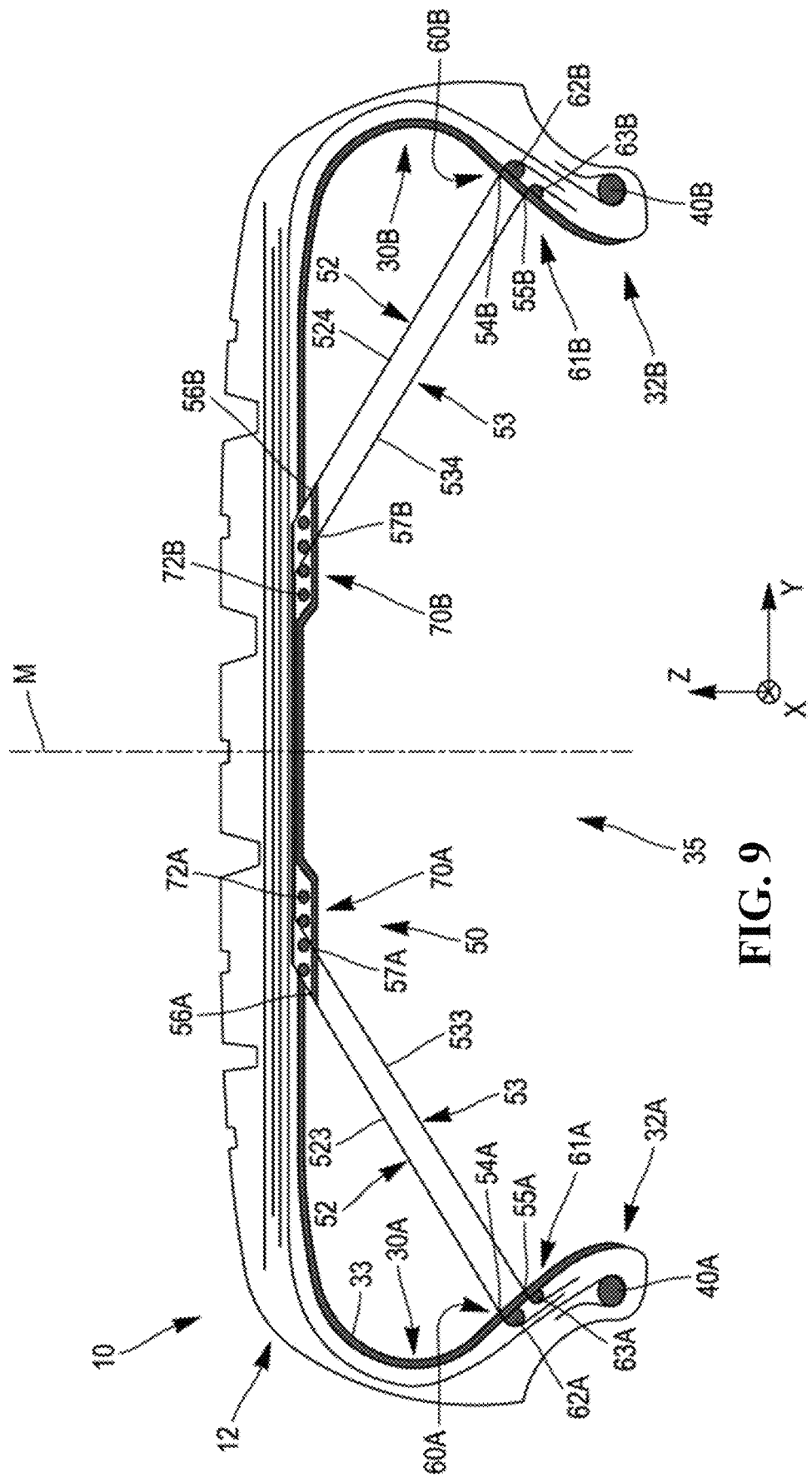
Figure 10:
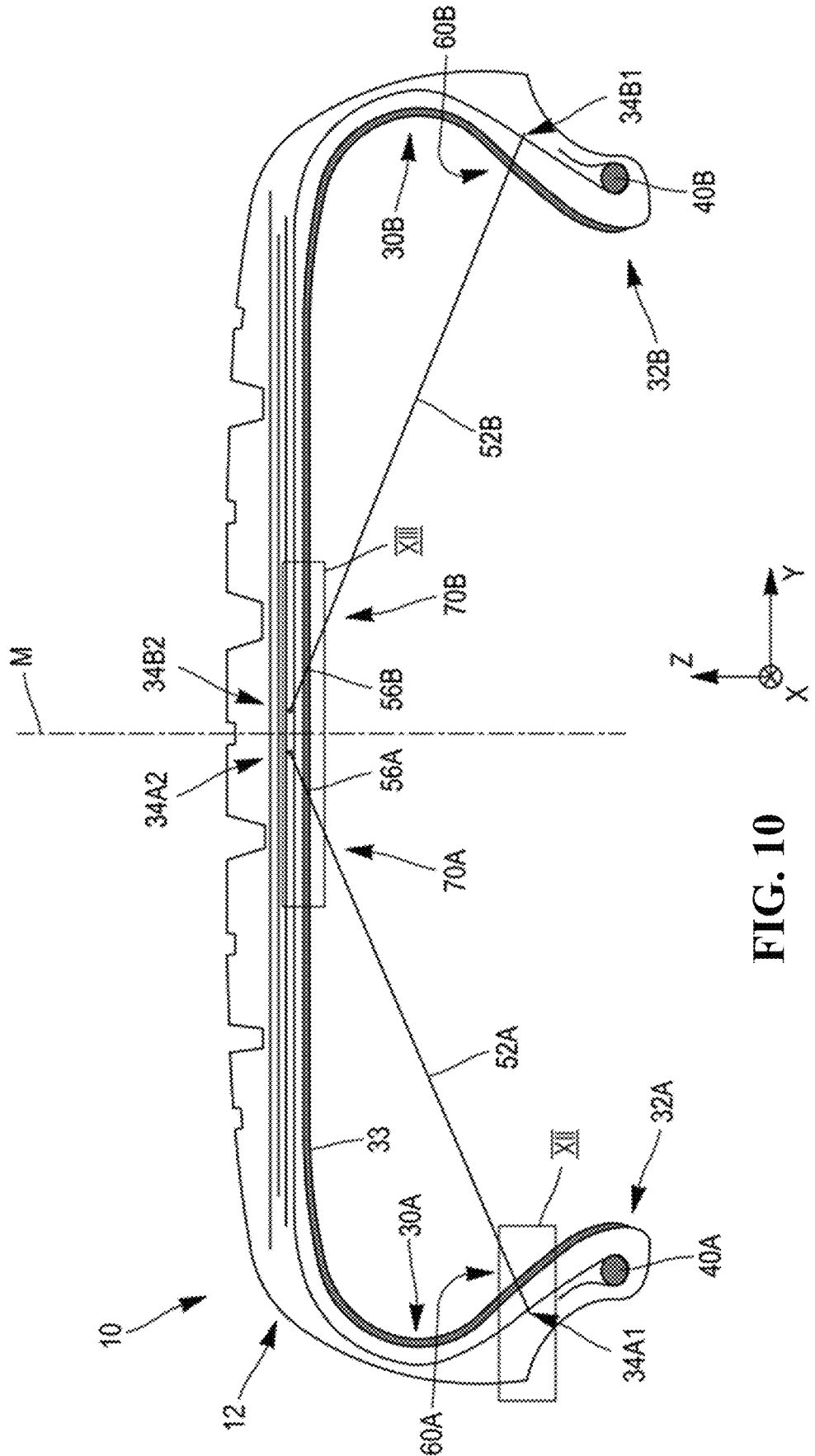
Figures 11, 12, 13:
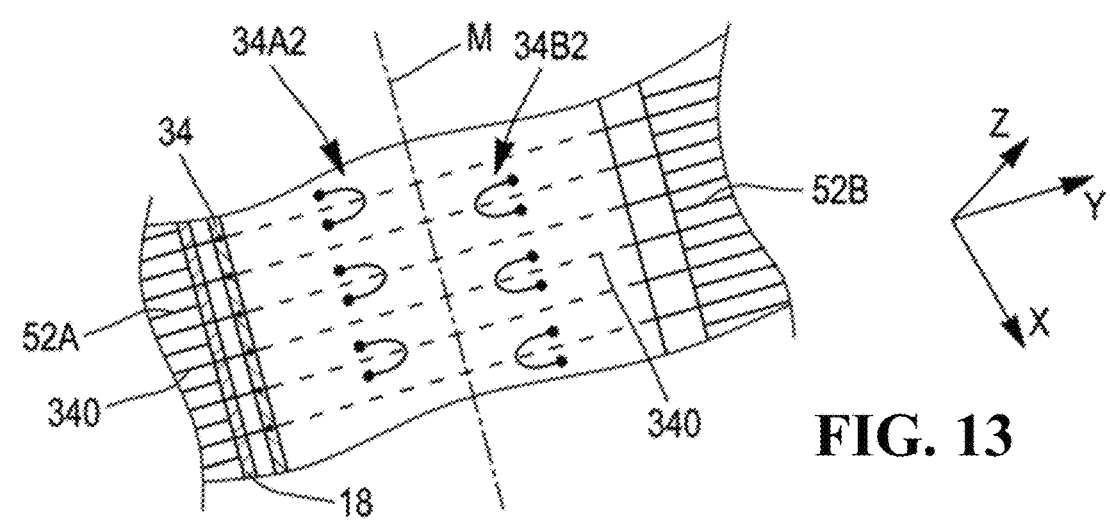
FIGS. 11 to 13 are views analogous to FIGS. 3 to 5 of the tyre from FIG. 10 in accordance with the sixth embodiment.

There has been represented in FIG. 9 a tyre in accordance with a fifth embodiment of the invention. Elements analogous to those of tyres in accordance with the previous embodiments are designated by identical references.

Unlike the fourth embodiment, the stiffening structure 50 comprises radially and axially outer anchor stiffening elements 52 and radially and axially inner anchor stiffening elements 53. The stiffening structure 50 comprises a first radially outer anchor reinforcing structure 60A of each radially and axially outer anchor stiffening element 52 in the first sidewall 30A and a first radially inner anchor reinforcing structure 61A of each radially and axially inner stiffening element 53 in the first sidewall 30A and distinct from the first radially outer reinforcing structure 60A and the first circumferential reinforcing element 40A. The stiffening structure 50 also comprises a second radially outer anchor reinforcing structure 60B of each radially and axially outer anchor stiffening element 52 in the second sidewall 30B and a second radially inner anchor reinforcing structure 61B of each radially and axially inner anchor stiffening element 53 in the second sidewall 30B and distinct from the second radially outer reinforcing structure 60B and the second circumferential reinforcing element 40B.

Unlike the fourth embodiment, each of the first and second radially inner anchor points 55A, 55B of each radially and axially inner anchor stiffening element 53 is radially inside each first and second radially inner anchor point 54A, 54B of each radially and axially outer anchor stiffening element 52.

It will be noted that each of the first and second radially outer anchor points 57A, 57B and each of the first and second first radially outer anchor points 56A, 56B are axially offset relative to one another. In a variant, it could be envisaged that they are radially and axially aligned with the same circumferential line.

It will be noted that each of the first and second radially inner reinforcing structures 60A, 60B is distinct from each of the first and second radially inner reinforcing structures 61A, 61B.

In this instance each radially inner reinforcing structure 60A, 60B, 61A, 61B comprises a respective filar reinforcing element 62A, 62B, 63A, 63B distinct from and discontinuous with respect to the filar reinforcing element of the other radially inner reinforcing structure in the same sidewall and/or the same bead. In a variant, it could be envisaged that these radially inner reinforcing structures are the same.

There have been represented in FIGS. 10 to 13 a tyre in accordance with a sixth embodiment of the invention. Elements analogous to those of the tyres in accordance with the previous embodiments are designated by identical references.

Unlike the previous embodiments, each of the first and second radially inner reinforcing structures 60A, 60B comprises a respective portion 34A1, 34B1 of the carcass reinforcement 34 extending radially in each of the sidewalls 30A, 30B. In this instance each stiffening element 52A, 52B is wound at least in part around a carcass filar reinforcing element 340 of each portion 34A1, 34B1 of the carcass reinforcement 34 extending radially in each of the sidewalls 30A, 30B.

In an analogous manner each of the first and second radially outer reinforcing structures 70A, 70B comprises a respective portion 34A2, 34B2 of the carcass reinforcement 34 extending axially in the crown 12. In this instance each stiffening element 52B is wound at least in part around a carcass filar reinforcing element 340 of each portion 34A2, 34B2 of the carcass reinforcement 34 extending axially in the crown 12.

Unlike the previous embodiments, in this sixth embodiment each of the first and second stiffening elements 52A, 52B is anchored in, and not around, each of the first and second radially inner reinforcing structures 60A, 60B and each of the first and second radially outer reinforcing structures 70A, 70B formed by each corresponding portion 34A1, 34B1, 34A2, 34B2 of the carcass reinforcement 34.

Figure 14:
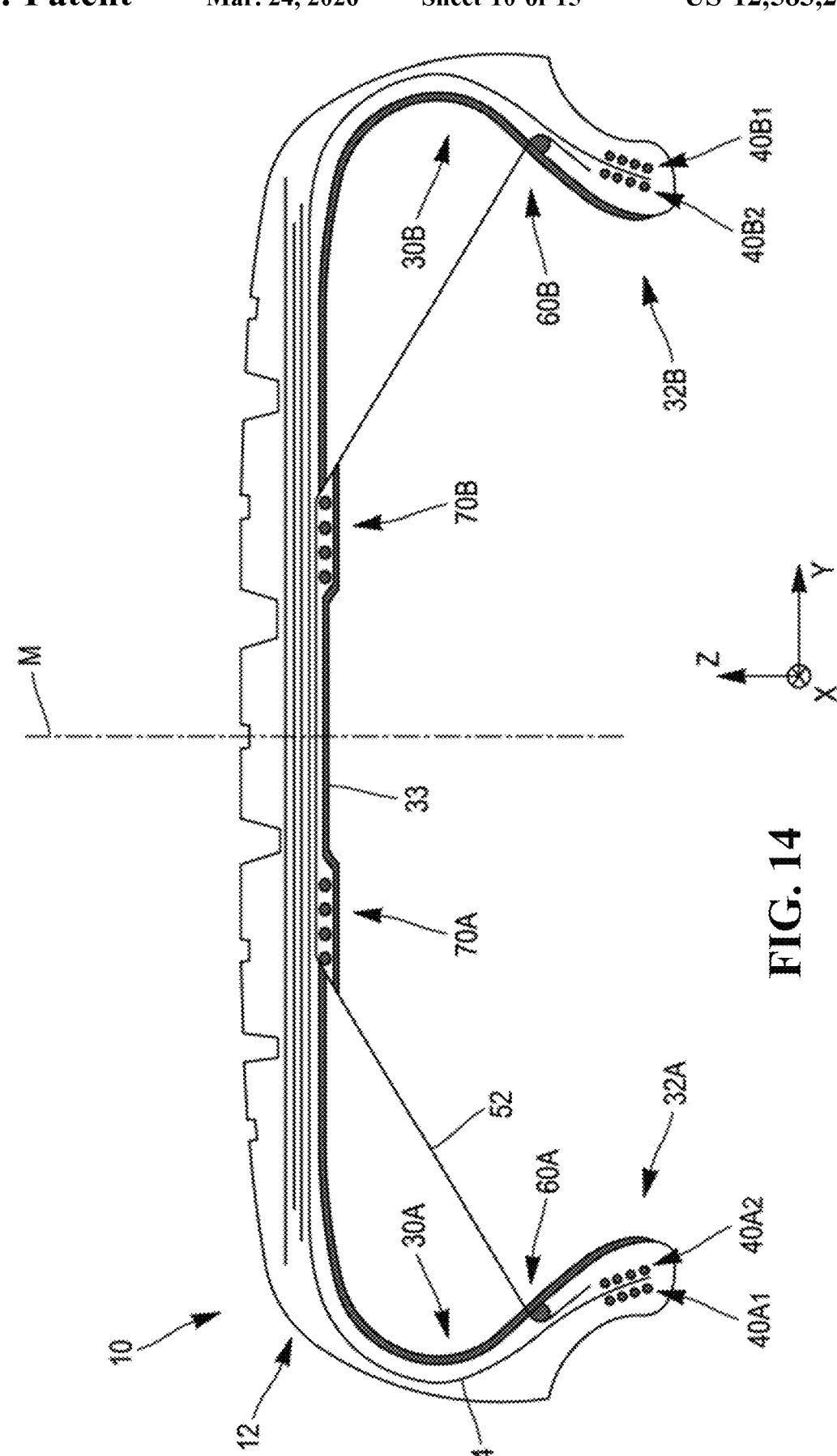
FIG. 14 is a view analogous to that of FIG. 1A of a tyre in accordance with a seventh embodiment.

There has been represented in FIG. 14 a tyre in accordance with a seventh embodiment of the invention. Elements analogous to those of the tyres in accordance with the previous embodiments are designated by identical references.

Unlike the first embodiment, the first and second beads 32A, 32B comprise respective circumferential reinforcing elements 40A1, 40A2 and 40B1, 40B2 enabling anchoring of the carcass reinforcement 34. Each of these circumferential reinforcing elements is a continuous filar reinforcing element comprising a plurality of circumferential turns around the axis of revolution, radially superposed on one another.

Obviously, embodiments could be envisaged comprising circumferential reinforcing elements identical to those of the seventh embodiment combined with the stiffening structures of the second, third, fourth, fifth and sixth embodiments.

Comparative Tests

In order to demonstrate the benefit of the invention with regard to the durability of the stiffening structure the tyre 10 in accordance with the first embodiment and a prior art tyre R as described in WO2020/128225 but with the dimension 275/35R19 have been compared. Each of the tyres 10 and R is mounted on a nominal rim and inflated to a pressure equal to 250 kPa. A test was then conducted analogous to the load/speed performance test described in appendix VII of EEC-UNO Rule No. 30, but under load and speed conditions that were more constraining. There was then noted the number of kilometres travelled before observing the first separation of the stiffening elements. This number of kilometres travelled was referred to a base 100 corresponding to the number of kilometres travelled by the prior art tyre R so that a number of kilometres travelled greater than 100 indicates improvement of the durability of the stiffening structure.

The test is passed if the tyre is fit for use after a kilometre threshold that each manufacture sets as a function of their specifications, for example between 10000 and 50000 kilometres. The prior art tyre R was tested under the conditions previously described and after a number of kilometres below the fixed kilometre threshold the prior art tyre R was no longer fit for use because of a loss of pressure following deterioration of its structure. To the contrary, the tyre 10 in accordance with the first embodiment crossed the kilometre threshold with no deterioration and was fit for numerous further kilometres.

In order to demonstrate the benefit of the invention concerning good flattening of the tread, the tyre 10 in accordance with the first embodiment and a control tyre R' not conforming to the invention in which the first radially outer anchor point is axially on the opposite side of the first radially inner structure with respect to the median plane of the tyre and the second radially outer anchor point is axially on the opposite side of the second radially inner structure with respect to the median plane of the tyre such that the portions 523 and 524 cross over in the toroidal cavity 35 were compared. The area of contact of each tyre 10 and R' with the ground was simulated with each of the tyres 10 and R' subjected to a given lateral force F, mounted on a nominal rim, inflated to a pressure equal to 250 kPa and under a load greater than the nominal load so as to simulate a transfer of load equivalent to the transfer of load that would be observed on an outer wheel of a vehicle negotiating a turn.

Figure 15:
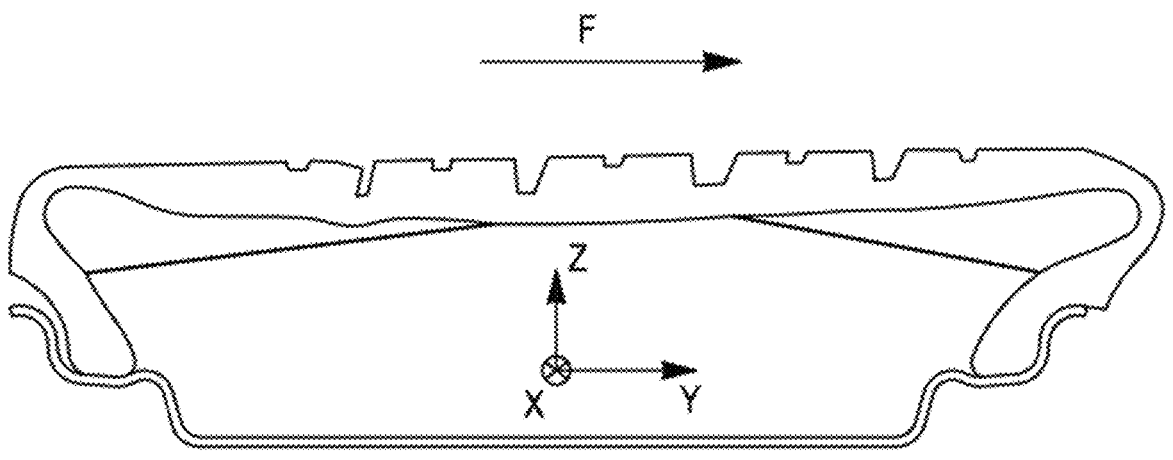
FIGS. 15 and 16 are views on a meridian section plane parallel to the axis of rotation of the tyre, respectively of the tyre from FIG. 1A and a control tyre not conforming to the invention subjected to a lateral force F.
Figure 16:
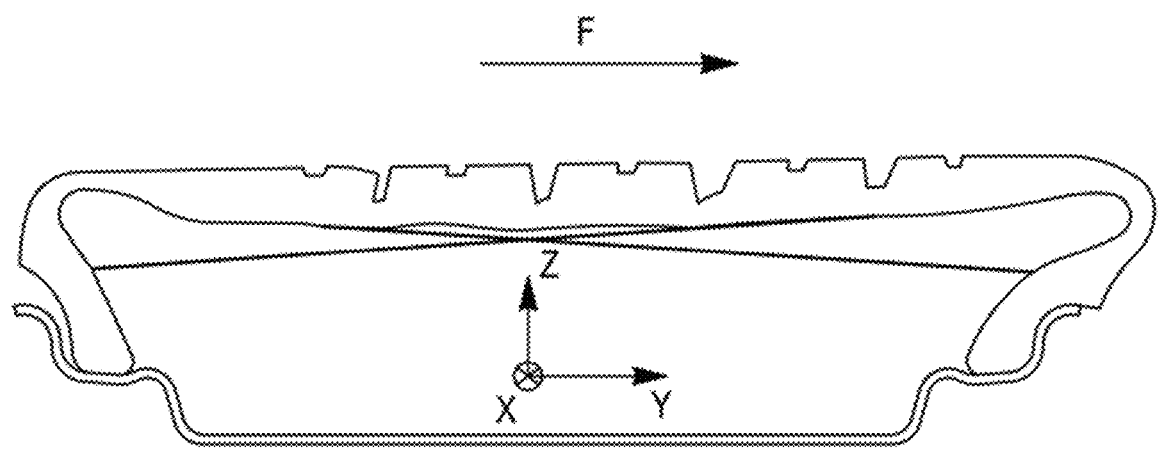
Figure 17:
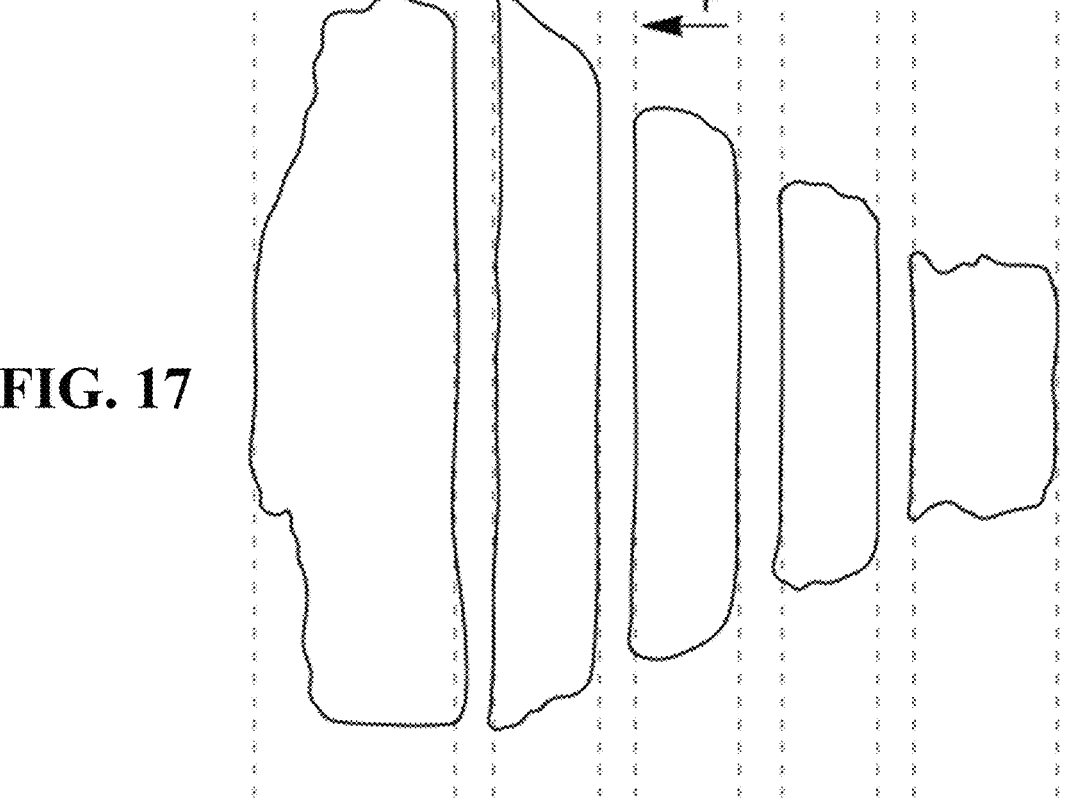
FIGS. 17 and 18 are views of the contact area of the tyre from FIG. 1A and of the control tyre not conforming to the invention subjected to the lateral force F, and FIG. 19 comprising FIGS. 19A, 19B, FIG. 20 comprising FIGS. 20A, 20B, FIG. 21 and FIG. 22 comprising
Figure 18:
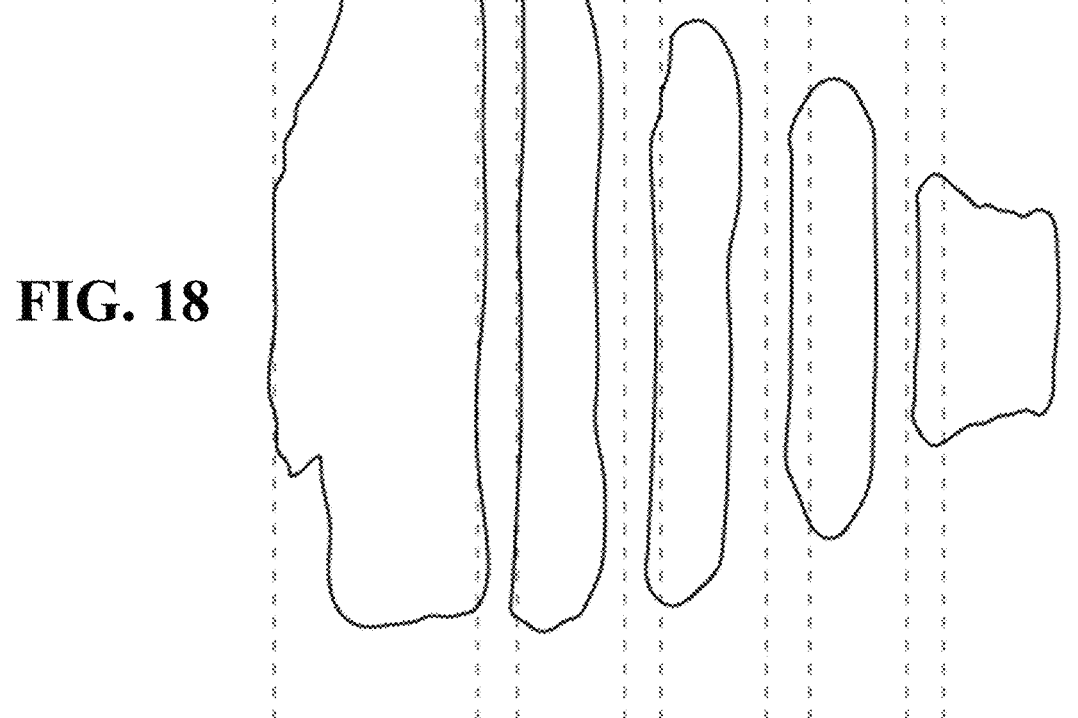

Note that in FIGS. 15 and 16 the number of axial flexing zones is lower for the tyre 10 according to the invention than for the control tyre R'. There have been represented in dashed line in FIGS. 17 and 18 the axial limits of each rib of the tread of the tyre 10 in order to be able to compare the areas of contact with one another. It is seen that each rib of the tread of the tyre 10 has a contact area width significantly greater than that of the corresponding rib of the tyre R'. As explained above, the fact that the portions 523 and 524 cross over in the toroidal cavity 35 of the tyre R' leads to the appearance of a plurality of axial flexing zones of the tread and therefore a reduction of the axial width of the ribs in contact with the ground, in particular by virtue of a displacement of the axial edges of each rib radially in the space formed by the longitudinal grooves of the tread delimited by the axial edges of each rib.

The radial stiffness Kzz, axial stiffness Kyy and the cornering stiffness D(z) of the tyre 10 in accordance with the first embodiment and of the tyre R were finally compared. These stiffnesses are substantially identical to those of the tyre described in WO2020/128225 with the dimension 275/35R19 and much better than those of a conventional prior art tyre with no stiffening structure.

There will now be described tooling and a method enabling manufacture of the tyre according to the invention.

In order to manufacture the tyre 10 in accordance with the first embodiment tooling and a method that will be described hereinafter are used.

As depicted in FIGS. 19A, 19B and 20A, 20B the tooling comprises a toroidal core 1000 having, around its main axis Z10, a convex outer receiving surface 1000_out and a radially external crown zone 1100 intended to receive the components constituting the crown 12, a first lateral zone 1200 curved toward the main axis Z10 of the core and intended to receive constituent components of the first sidewall 30A and the first bead 32A and a second lateral zone 1300 curved toward the main axis Z10 of the core and intended to receive constituent components of the second sidewall 30B and the second bead 32B.

As a result, the core 1000 defines a so-called reserved volume that is delimited externally by the receiving surface 1000_out and corresponds to the internal cavity 35. The core 1000 is thus able to occupy, and thus to reserve temporarily during manufacture of the tyre, the volume of which the shape and the dimensions correspond to those of the internal cavity 35, which volume will become the internal cavity 35.

The core 1000 has a plurality of passages 1500 that extend inside the reserved volume, under the receiving surface 1000_out, and open onto said receiving surface 1000_out so that each of said passages 1500 connects the crown zone 1100 of the receiving surface 1000_out to one of the first and second lateral zones 1200, 1300 in order for the core 10 to be able to receive the stiffening elements 52 in said passages 1500. The grooves 1500 are blind grooves and have a solid bottom 1900 situated under the receiving surface 1000_out in the reserved volume.

As can be seen in FIG. 20A in particular, the core 1000 comprises an assembly made up of a plurality annular sub-assemblies 2100, 2200, 2300 including: i) a first annular sub-assembly 2100 termed the central crown 2100, which forms a central portion of the crown zone 1100 of the receiving surface 1000_out intended to receive one or more constituent components of the crown 12, ii) a second annular sub-assembly 2200 termed the left ear 2200 containing the grooves 1500 forming the passages intended for the stiffening elements 52 that connect the first sidewall 30A to the crown 12, and iii) a third annular sub-assembly 2300 termed the right ear 2300 containing the grooves 1500 forming the passages intended for the stiffening elements 52 that connect the second sidewall 30B to the crown 12.

Each of said annular sub-assemblies 2100, 2200, 2300 is angularly divided into sectors 2400, 2500, 2600, 2700, 2800, 2900 in azimuth around the main axis Z10 with alternating so-called "key" sectors 2400, 2600, 2800 and so-called "vault" sectors 2500, 2700, 2900 retained and locked in position by the keys 2400, 2600, 2800 and designed to become manoeuvrable after they have been freed by removing the keys 2400, 2600, 2800. The central ring 2100 is divided into a plurality of ring keys 2400 and ring vaults 2500. Both the ear keys 2600, 2800 and the ear vaults 2700, 2900 are preferably made of metal alloy, more preferably aluminium alloy.

The method for manufacturing the tyre 10 amounts in practice to using tooling as described above. The method comprises a preparation step (S0) during which the tooling is prepared. During said preparation step (S0) the keys 2400 and the vaults 2500 will be assembled to form said central ring, as depicted in FIGS. 20A and 20B, after which there will be fixed onto each of the clearance faces 3200, 3300 a succession of ear keys 2600, 2800 and ear vaults 2700, 2900 to form the ears 2200, 2300.

Figure 21:
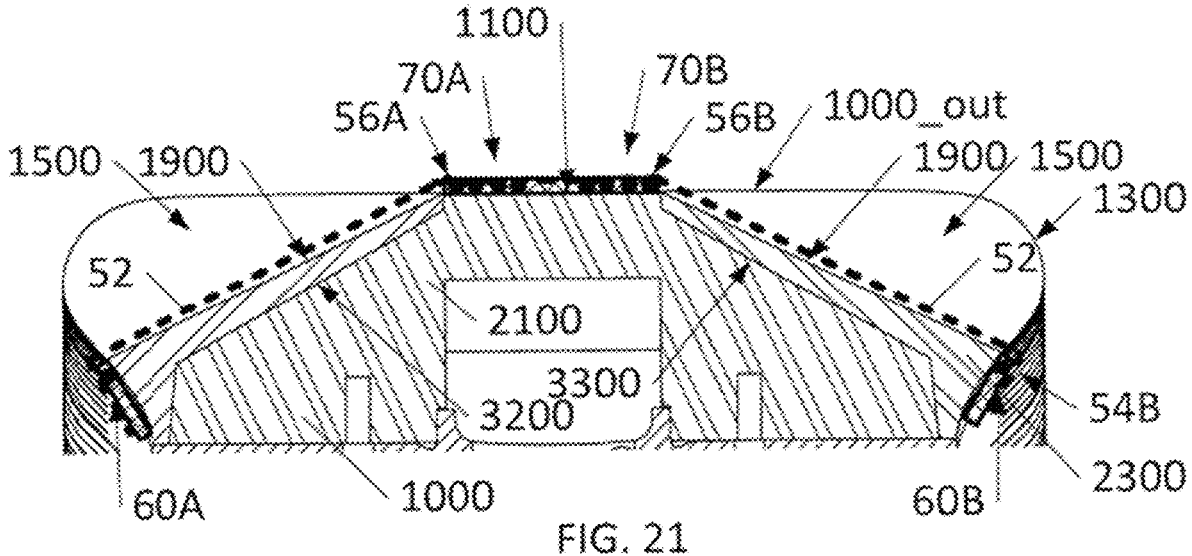

The method thereafter comprises a step (S2) of fitting the stiffening elements 52 during which the stiffening element 52 is passed through each passage 1500. To this end, a stiffening element 52 is disposed continuously along a boustrophedon path through the successive passages 1500, here by inserting the continuous stiffening element 52 in the grooves 1500 and causing the continuous stiffening element 52 to emerge above the receiving surface 1000_out in the crown zone 1100 and in the lateral zones 1200, 1300, at the level of the radially inner anchor points 54A, 54B and radially outer anchor points 56A, 56B, as can be seen in FIG. 21. Then, in a step that is not depicted, the method comprises a protection step (S3) during which an anti-penetration device (not depicted) is used which during the mounting step (S4) and the curing step (S5) cooperates with the core 1000 to constitute an obstacle to penetration of the constituent components of the crown 12, the sidewalls 30A, 30B and the beads 32A, 32B into the grooves 1500 in which the stiffening elements 52 are engaged. An anti-penetration device of this kind could comprise elements for filling the grooves 1500 or masking bands or shells placed over the grooves so as to cover the grooves 1500.

The method then comprises a mounting step (S4) during which there are disposed on the receiving surface 1000_out the constituent components of the crown 12, the sidewalls 30A, 30B and the beads 32A, 32B. Said components comprise bands or layers based on polymer compounds and the filar reinforcing elements enable the various layers of the tyre 10 to be formed.

The method then comprises a curing step (S5) during which the core 1000 and the preform of the tyre 10 carried by said core 1000 are placed in a curing mould in order to vulcanise the components.

Figures 22A, 22B, 22C, 22D, 22E, 22F:
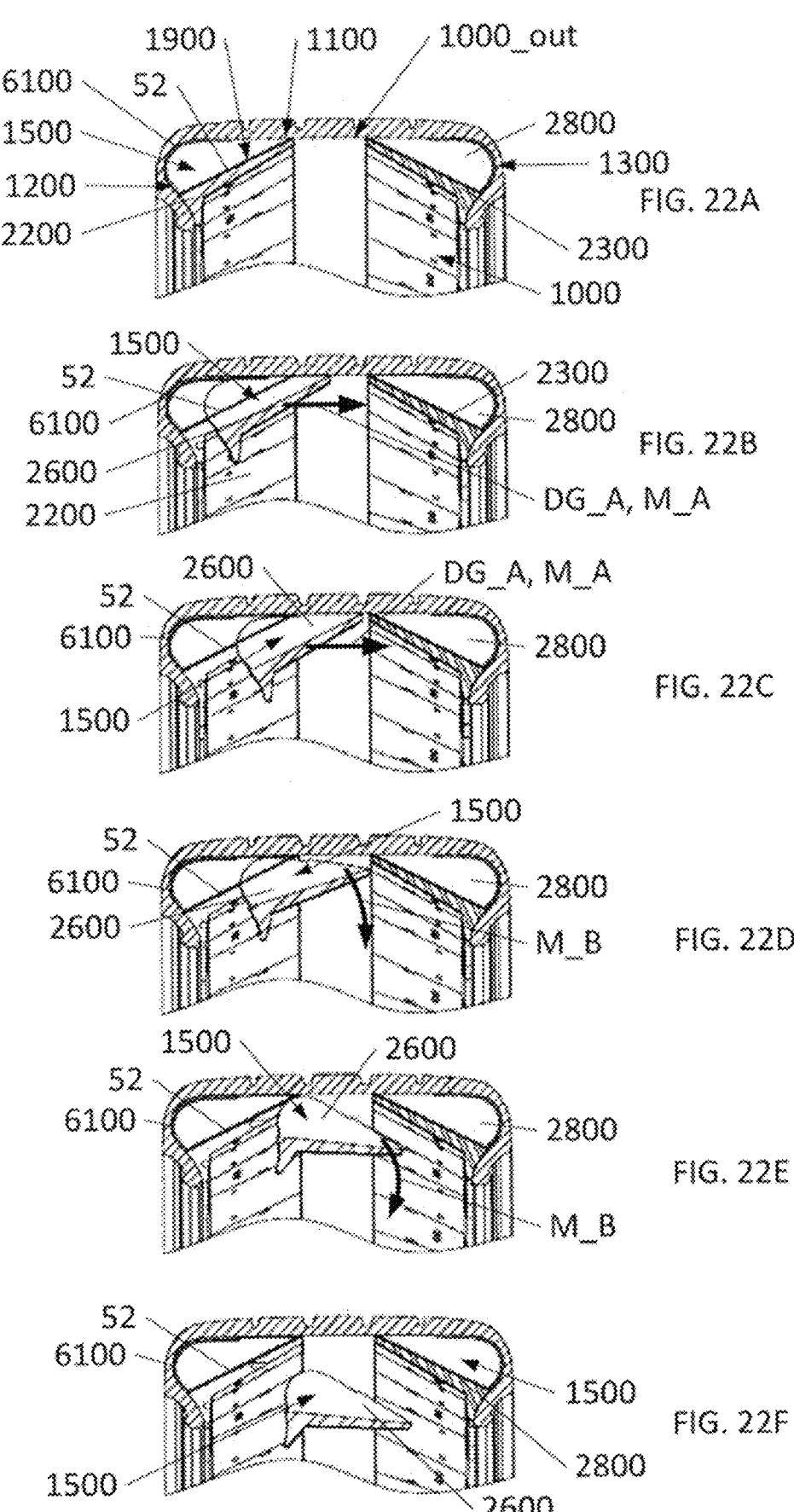
FIGS. 22A and 22F depict tooling and a method for manufacturing the tyre according to the first embodiment.

The method then comprises a step (S6) of extraction from the mould during which the core 1000 of the tyre 10 is disengaged, leaving the stiffening elements 52 in place in the internal cavity 35, as depicted in particular in the sequences of FIGS. 22A to 22F. Said parts are demounted and progressively extracted to free the tyre 10. The step (S6) of extraction from the mould comprises first a first sub-step of removal of the central ring 2100 during which the keys 2400 are removed radially from the central ring, followed by the vaults 2500 of the central ring, in order to free the ears 2200,

2300, so that the configuration is such that the sectors 2600, 2700, 2800, 2900 of the ears 2200, 2300 are accessible from the interior of the tyre 10 as depicted in FIG. 22A, then a second sub-step of extraction of a first ear 2200 during which the keys 2600 of one of the left and right ears are extracted from the internal cavity 35, after which the vaults 2700 of said ear 2200 are extracted from the internal cavity 35, in order to free the corresponding portion of the internal cavity 35 and the stiffening elements 52 that are located in said portion, then a third sub-step of extraction of the other ear 2300 carried out in an analogous manner to the second sub-step. Here the sectors 2600, 2700, 2800, 2900 are effected by means of an axial extraction movement in translation M_A, if the lateral walls of the grooves 1500 are generated in an axial generatrix direction DG_A colinear with the main axis Z10, as depicted in FIG. 22B; said axial extraction movement in translation M_A may be followed by a movement of tilting in pitch M_B about an axis normal to the sagittal meridian plane of the sector 2600, 2700, 2800, 2900 concerned, as depicted in FIGS. 22D, 22E. When the sector 2600, 2700, 2800, 2900 has been disengaged from the stiffening element 52, the extraction sequence may be completed freely from the interior of the tyre 10, for example, as depicted in FIG. 22F, by a radial movement that moves the sector 2600, 2700, 2800, 2900 concerned toward the main axis Z10 so that said sector is completely removed from the tyre 10. When the sectors 2600, 2700 of an ear 2200 have been extracted, or after each of the ears 2200, 2300 has been freed, the anti-penetration device may in turn be extracted. For example, in the case of masking bands, the latter may be extracted by spiral sliding that causes them to enter the space comprised between two successive stiffening elements 52.

After the preparation step (S0) and before the step (S2) said method comprises a pre-mounting step (S1) during which, as depicted in FIG. 21, the radially inner reinforcing structures 60A, 60B and the radially outer reinforcing structures 70A, 70B are placed on the lateral zones 1200, 1300 and the crown zone 1100 of the receiving surface 1000_out of the core 1000, facing the radially inner anchor points 54A, 54B and the radially outer anchor points 56A, 56B. The loops forming the portions 521, 522 will be found to be captive on the radially inner reinforcing structures 60A, 60B and other adjacent components of the tyre 10 placed on the lateral zones 1200, 1300, while the portions 525 will be found to be captive on the radially outer reinforcing structures 70A, 70B and other adjacent components of the tyre 10.

The invention is not limited to the embodiments described above.

In fact, combining the second embodiment with the fourth and fifth embodiments could indeed be envisaged.

Without departing from the scope of the invention, there could be envisaged using a cavity noise absorber, for example fixed to the mounting support of the tyre or to the tyre itself so as to reduce the cavity noise of the tyre. Noise absorbers of this kind are described in particular in WO2018046376, WO2013182477, WO2011051203, EP2660075, EP1253025, EP1876038 and EP3406462.

The invention claimed is:

1. A tire comprising:
   a crown comprising a crown reinforcement;
   a first sidewall and a second sidewall, which each extend the crown radially inward and which are respectively arranged on a first side and a second side of a median plane of the tire;
   a first bead and a second bead, which each extend the first sidewall and the second sidewall radially inward respectively and which are respectively arranged on the first side and the second side of the median plane;

an internal surface delimiting a toroidal cavity for inflating the tire;

a carcass reinforcement, which is anchored in each of the first and second beads and which extends in each of the first and second sidewalls and in the crown, the carcass reinforcement being radially inside the crown reinforcement in the crown; and a stiffening structure comprising:

one or more stiffening elements, the or each stiffening element extending continuously in the toroidal cavity from the first sidewall or the first bead as far as the second sidewall or the second bead via the crown, at least one radially outer reinforcing structure that is:
arranged in the crown,
distinct from the carcass reinforcement, from the crown reinforcement, and from the or each stiffening element, and
buried in a crown material mass of the crown, which physically separates the at least one radially outer reinforcing structure from the crown reinforcement and from the carcass reinforcement, a first radially inner reinforcing structure that is:
arranged in the first sidewall or the first bead,
distinct from the carcass reinforcement and from the or each stiffening element, and
buried in a first material mass of the first sidewall or the first bead, which physically separates the first radially inner reinforcing structure from the carcass reinforcement, and a second radially inner reinforcing structure that is:
arranged in the second sidewall or the second bead,
distinct from the carcass reinforcement and from the or each stiffening element, and
buried in a second material mass of the second sidewall or the second bead, which physically separates the second radially inner reinforcing structure from the carcass reinforcement, wherein the or each stiffening element:
passes through the internal surface at a first radially inner anchor point of the first sidewall or the first bead to extend from said first radially inner anchor point deep into said first material mass so as to be anchored beneath the internal surface in or around the first radially inner reinforcing structure and to be physically separated by said first material mass from the carcass reinforcement,
passes through the internal surface at a first radially outer anchor point of the crown to extend from said first radially outer anchor point deep into said crown material mass so as to be anchored beneath the internal surface in or around the at least one radially outer reinforcing structure and to be physically separated by said crown material mass from the carcass reinforcement and the crown reinforcement,
comprises a first portion extending in the toroidal cavity between the first radially inner anchor point and the first radially outer anchor point,
passes through the internal surface at a second radially inner anchor point of the second sidewall or the second bead to extend from said second radially inner anchor point deep into said second material mass so as to be anchored beneath the internal surface in or around the second radially inner reinforcing structure and to be physically separated by said second material mass from the carcass reinforcement, passes through the internal surface at a second radially outer anchor point of the crown to extend from said second radially outer anchor point deep into said crown material mass so as to be anchored beneath the internal surface in or around the at least one radially outer reinforcing structure and to be physically separated by said crown material mass from the carcass reinforcement and the crown reinforcement, and comprises a second portion extending in the toroidal cavity between the second radially inner anchor point and the second radially outer anchor point, wherein the first radially outer anchor point and the first radially inner anchor point for the or each stiffening element are arranged on the first side of the median plane, wherein the second radially outer anchor point and the second radially inner anchor point for the or each stiffening element are arranged on the second side of the median plane, and wherein the first portion and the second portion of the or each stiffening element do not cross over in the toroidal cavity.

2. The tire according to claim 1, wherein the one or more stiffening elements form a continuous stiffening element so as to trace out a boustrophedon path through the crown between the first sidewall or the first bead and the second sidewall or the second bead.

3. The tire according to claim 1, wherein the stiffening structure comprises a plurality of stiffening elements distributed circumferentially in the toroidal cavity.

4. The tire according to claim 1, wherein each of the first radially inner anchor point and the second radially inner anchor point is arranged radially at a radial distance from 0.10×H to 0.50×H from a radially innermost point of the tire, H being a section height of the tire.

5. The tire according to claim 1, wherein each of the first radially outer anchor point and the second radially outer anchor point is arranged axially at an axial distance at most equal to 0.45×SW from the median plane, SW being a nominal section width of the tire.

6. The tire according to claim 1, wherein the or each stiffening element is a filar stiffening element.

7. The tire according to claim 1, wherein the at least one radially outer reinforcing structure includes:

a first radially outer reinforcing structure that is:
arranged in the crown,
distinct from the carcass reinforcement, from the crown reinforcement and from the or each stiffening element, and
buried in a first crown material mass of the crown, which physically separates the first radially outer reinforcing structure from the crown reinforcement and from the carcass reinforcement, and a second radially outer reinforcing structure that is:
arranged in the crown,
distinct from the carcass reinforcement, from the crown reinforcement, from the or each stiffening element, and from the first radially outer reinforcing structure, and
buried in a second crown material mass of the crown, which physically separates the second radially outer reinforcing structure from the crown reinforcement and from the carcass reinforcement, and wherein the or each stiffening element:

passes through the internal surface at the first radially outer anchor point to extend from said first radially outer anchor point deep into said first crown material mass so as to be anchored beneath the internal surface in or around the first radially outer reinforcing structure, and passes through the internal surface at the second radially outer anchor point to extend from said second radially outer anchor point deep into said second crown material mass so as to be anchored beneath the internal surface in or around the second radially outer reinforcing structure.

8. The tire according to claim 7, wherein the first radially outer reinforcing structure and the second radially outer reinforcing structure are respectively arranged on the first side and the second side of the median plane.

9. The tire according to claim 1, wherein each of the first radially inner reinforcing structure, the second radially inner reinforcing structure, and the at least one radially outer reinforcing structure comprises at least one filar reinforcing element extending in a main direction forming with a circumferential direction of the tire an angle less than or equal to 10°.

10. The tire according to claim 9, wherein the tire has a substantially toroidal shape around an axis of revolution, and wherein the at least one filar reinforcing element of each of the first radially inner reinforcing structure and the second radially inner reinforcing structure is wound circumferentially over at most two complete turns around the axis of revolution.

11. The tire according to claim 9, wherein the tire has a substantially toroidal shape around an axis of revolution, and wherein the at least one filar reinforcing element of the at least one radially outer reinforcing structure is wound circumferentially over at least two complete turns around the axis of revolution and at most ten complete turns around the axis of revolution.

12. The tire according to claim 9, wherein the or each stiffening element is wound at least in part around the at least one filar reinforcing element.

13. A tire comprising:

a crown comprising a crown reinforcement;

a first sidewall and a second sidewall, which each extend the crown radially inward and which are respectively arranged on a first side and a second side of a median plane of the tire;

a first bead and a second bead, which each extend the first sidewall and the second sidewall radially inward respectively and which are respectively arranged on the first side and the second side of the median plane;

an internal surface delimiting a toroidal cavity for inflating the tire;

a carcass reinforcement, which is anchored in each of the first and second beads and which extends in each of the first and second sidewalls and in the crown, the carcass reinforcement being radially inside the crown reinforcement in the crown; and a stiffening structure comprising:

one or more first stiffening elements, the or each first stiffening element extending continuously in the toroidal cavity from the first sidewall or the first bead as far as the crown, and one or more second stiffening elements, the or each second stiffening element extending continuously in the toroidal cavity from the second sidewall or the second bead as far as the crown, at least one radially outer reinforcing structure that is:

arranged in the crown, distinct from the carcass reinforcement, from the crown reinforcement, and from the or each first stiffening element and the or each second stiffening element, and buried in a crown material mass of the crown, which physically separates the at least one radially outer reinforcing structure from the crown reinforcement and from the carcass reinforcement, a first radially inner reinforcing structure that is:

arranged in the first sidewall or the first bead, distinct from the carcass reinforcement and from the or each first stiffening element and the or each second stiffening element, and buried in a first material mass of the first sidewall or the first bead, which physically separates the first radially inner reinforcing structure from the carcass reinforcement, and a second radially inner reinforcing structure that is:

arranged in the second sidewall or the second bead, distinct from the carcass reinforcement and from the or each first stiffening element and the or each second stiffening element, and buried in a second material mass of the second sidewall or the second bead, which physically separates the second radially inner reinforcing structure from the carcass reinforcement, wherein the or each first stiffening element:

passes through the internal surface at a first radially inner anchor point of the first sidewall or the first bead to extend from said first radially inner anchor point deep into said first material mass so as to be anchored beneath the internal surface in or around the first radially inner reinforcing structure and to be physically separated by said first material mass from the carcass reinforcement, passes through the internal surface at a first radially outer anchor point of the crown to extend from said first radially outer anchor point deep into said crown material mass so as to be anchored beneath the internal surface in or around the at least one radially outer reinforcing structure and to be physically separated by said crown material mass from the carcass reinforcement and the crown reinforcement, and comprises a portion extending in the toroidal cavity between the first radially inner anchor point and the first radially outer anchor point, wherein the or each second stiffening element:

passes through the internal surface at a second radially inner anchor point of the second sidewall or the second bead to extend from said second radially inner anchor point deep into said second material mass so as to be anchored beneath the internal surface in or around the second radially inner reinforcing structure and to be physically separated by said second material mass from the carcass reinforcement, passes through the internal surface at a second radially outer anchor point of the crown to extend from said second radially outer anchor point deep into said crown material mass so as to be anchored beneath the internal surface in or around the at least one radially outer reinforcing structure and to be physically separated by said crown material mass from the carcass reinforcement and the crown reinforcement, and comprises a portion extending in the toroidal cavity between the second radially inner anchor point and the second radially outer anchor point, wherein the first radially outer anchor point and the first radially inner anchor point for the or each first stiffening element are arranged on the first side of the median plane, wherein the second radially outer anchor point and the second radially inner anchor point for the or each second stiffening element are arranged on the second side of the median plane, and wherein said portion of the or each first stiffening element and said portion of the or each second stiffening element do not cross over in the toroidal cavity.

14. The tire according to claim 13, wherein the stiffening structure comprises a plurality of first stiffening elements distributed circumferentially in the toroidal cavity and a plurality of second stiffening elements distributed circumferentially in the toroidal cavity.

15. The tire according to claim 13, wherein each of the first radially inner anchor point and the second radially inner anchor point is arranged radially at a radial distance from $0.10 \times H$ to $0.50 \times H$ from a radially innermost point of the tire, H being a section height of the tire.

16. The tire according to claim 13, wherein each of the first radially outer anchor point and the second radially outer anchor point is arranged axially at an axial distance at most equal to $0.45 \times SW$ from the median plane, SW being a nominal section width of the tire.

17. The tire according to claim 13, wherein the or each first stiffening element is a filar stiffening element, and wherein the or each second stiffening element is a filar stiffening element.

18. The tire according to claim 13, wherein each of the first radially inner reinforcing structure, the second radially inner reinforcing structure, and the at least one radially outer reinforcing structure comprises at least one filar reinforcing element extending in a main direction forming with a circumferential direction of the tire an angle less than or equal to 10°.

19. The tire according to claim 18, wherein the tire has a substantially toroidal shape around an axis of revolution, and wherein the at least one filar reinforcing element of each of the first radially inner reinforcing structure and the second radially inner reinforcing structure is wound circumferentially over at most two complete turns around the axis of revolution.

20. The tire according to claim 18, wherein the tire has a substantially toroidal shape around an axis of revolution, and wherein the at least one filar reinforcing element of the at least one radially outer reinforcing structure is wound circumferentially over at least two complete turns around the axis of revolution and at most ten complete turns around the axis of revolution.

21. The tire according to claim 18, wherein the or each first stiffening element and the or each second stiffening element are wound at least in part around the at least one filar reinforcing element.

* * * * *